United States Patent [19]

Kruesi et al.

[11] Patent Number: 5,138,710
[45] Date of Patent: Aug. 11, 1992

[54] APPARATUS AND METHOD FOR PROVIDING RECOVERABILITY IN MASS STORAGE DATA BASE SYSTEMS WITHOUT AUDIT TRAIL MECHANISMS

[75] Inventors: Frederick C. Kruesi, Exton; David W. Heileman, Jr., West Chester, both of Pa.

[73] Assignee: Unisys Corporation, Blue Bell, Pa.

[21] Appl. No.: 514,783

[22] Filed: Apr. 25, 1990

[51] Int. Cl.⁵ .............................................. G06F 11/00
[52] U.S. Cl. ................................ 395/575; 371/10.1; 364/256.4; 364/268.5; 364/DIG. 1; 364/961.2; 364/963.3; 364/DIG. 2
[58] Field of Search ........................................ 371/10.1

[56] References Cited

U.S. PATENT DOCUMENTS

| | | | |
|---|---|---|---|
| 3,840,862 | 10/1974 | Ready | 364/200 |
| 4,148,098 | 4/1979 | McCreight et al. | 364/200 |
| 4,419,725 | 12/1983 | George et al. | 371/10.1 |
| 4,637,024 | 1/1987 | Dixon et al. | 364/200 |

Primary Examiner—Jerry Smith
Assistant Examiner—Henry C. Lebowitz
Attorney, Agent, or Firm—Albert B. Cooper; Mark T. Starr

[57] ABSTRACT

Message Segments comprising Messages are stored in a flat file on disk. A unique Message Number is assigned to each Message and each Message Segment is stored at a flat file address (Segment Descriptor) in a record containing the Message Segment data and recovery information. the Recovery Information includes fields for an Available Marker, Message Number, Segment Sequence Number, Final Flag and Last Address. The Available Marker denotes whether the Message Segment is in-use or available. The Message Number field contains the Message Number identifying the Message which contains the Segment. The Segment Sequence Number donotes the order in a Message occupied by the Segment. The Final Flag field contains a flag if the Messge Segment is the Last Segment of the Message. The Last Address field contains the Segment Descriptor of the Last Message Segment of the Message containing the Segment. A data base for accessing the Message Segments is maintained on disk. Each data base record contains the Message Number identifying the Message and the Segment Descriptors of the Message Segments comprising the Message. Recovery and rebuilding of the data base from the Recovery Information in the flat file is performed if the data base inconsistency is detected. Comparisons of the Message Numbers in the data base and Recovery Information and testing the Availability Marker provide indicia for initiating recovery of the data base from the Recovery Information.

65 Claims, 31 Drawing Sheets

FIG.2

DATA BASE  21

| MESSAGE NUMBER(MN) | SN | SC | DBN | IMF | SEGMENT DESCRIPTORS(SD) | | | | |
|---|---|---|---|---|---|---|---|---|---|
| 100 | 1 | 3 | 1 | C | 2 | 4 | 6 | | |
| 200 | 1 | 7 | 2 | C | 1 | 3 | 5 | 10 | 13 | 11 |
| 200 | 2 | | | C | 15 | | | | |

FIG.3

FLAT FILE  20

RECOVERY INFORMATION(RI)

| MS | RECEIVED DATA | AM | SP | MN | SSN | DBN | FF | L | LA | CS |
|---|---|---|---|---|---|---|---|---|---|---|
| 1 | | I | 1 | 200 | 1 | 2 | | 2000 | 15 | |
| 2 | | I | 2 | 100 | 1 | 1 | | 2000 | 6 | |
| 3 | | I | 3 | 200 | 2 | 2 | | 2000 | 15 | |
| 4 | | I | 4 | 100 | 2 | 1 | | 2000 | 6 | |
| 5 | | I | 5 | 200 | 3 | 2 | | 2000 | 15 | |
| 6 | | I | 6 | 100 | 3 | 1 | F | 54 | 6 | |
| 7 | | A | 7 | | | | | | | |
| 8 | | A | 8 | | | | | | | |
| 9 | | A | 9 | | | | | | | |
| 10 | | I | 10 | 200 | 4 | 2 | | 2000 | 15 | |
| 11 | | I | 11 | 200 | 6 | 2 | | 2000 | 15 | |
| 12 | | A | 12 | | | | | | | |
| 13 | | I | 13 | 200 | 5 | 2 | | 2000 | 15 | |
| 14 | | A | 14 | | | | | | | |
| 15 | | I | 15 | 200 | 7 | 2 | F | 898 | 15 | |
| 16 | | A | | | | | | | | |
| ⋮ | | | | | | | | | | |
| N | | A | | | | | | | | |

(ARI-1)

(ARI-1)

FIG.7
(RIV-1)

```
COMPUTE CHECKSUM OF RI
        ↓
DOES CHECKSUM MATCH RI CHECKSUM --N--> RETURN ERROR
        │Y
        ↓
DOES SP POINT TO THIS MS --N--> RETURN ERROR
        │Y
        ↓
RECOVERY INFORMATION VERIFIED
```

FIG.8A
(VFFP-1)

```
OBTAIN A FFP FROM THE UFFL
        ↑
(FROM VFFP-2 17)
        ↓
RECOVERY IN PROCESS --Y--> READ ENTIRE MS
        │N                        │
        ↓                         │
READ RI OF MS  ←──────────────────┘
        ↓
PERFORM RECOVERY INFORMATION VERIFICATION
        ↓
ERROR DETECTED --Y--> (FROM VFFP-3 21)
        │N
        ↓
(FROM VFFP-2 16)
```

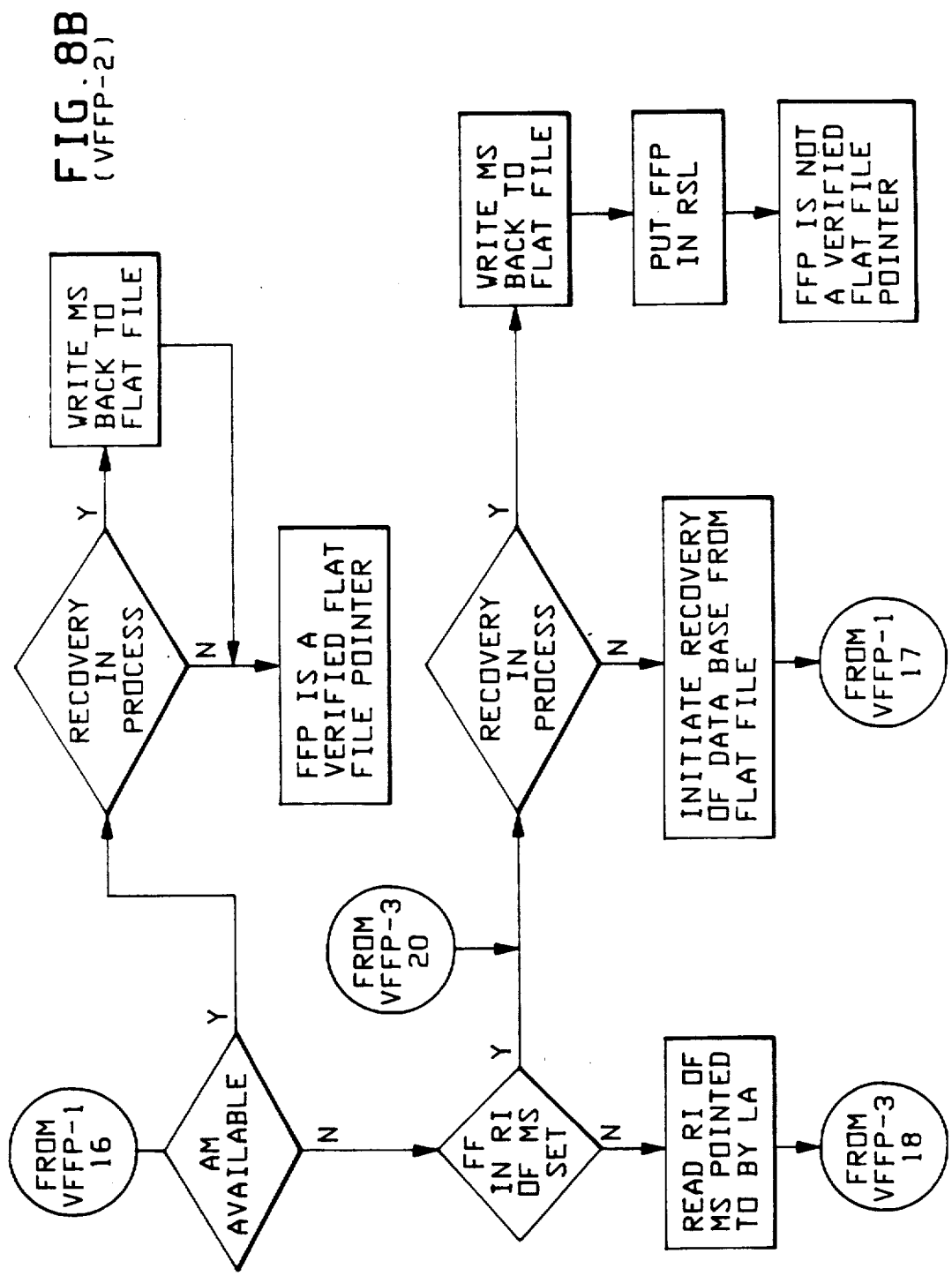
FIG. 8B (VFFP-2)

(VFFP-3)

(MNMV-1)

(IMP-1)

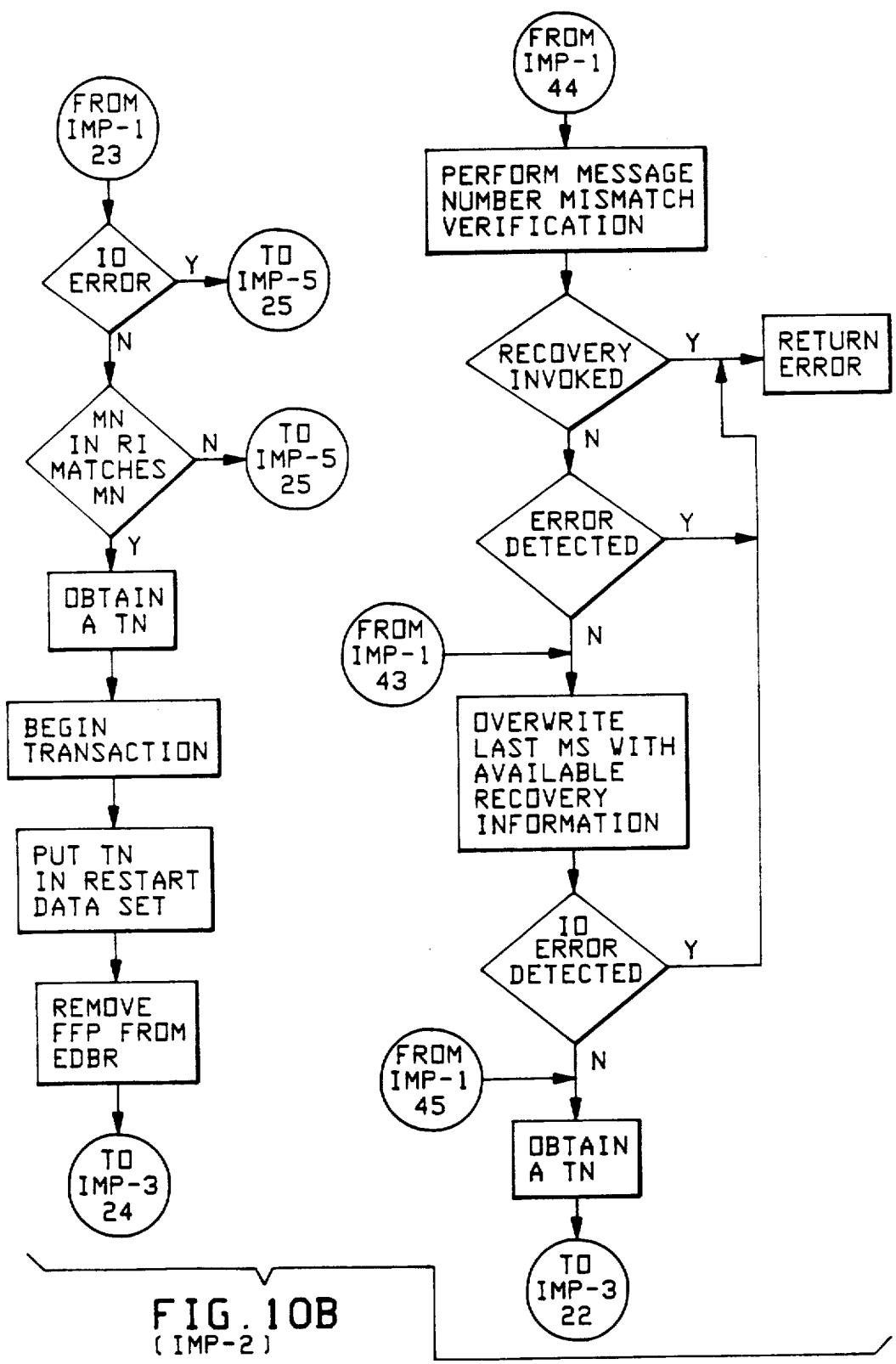
FIG. 10B (IMP-2)

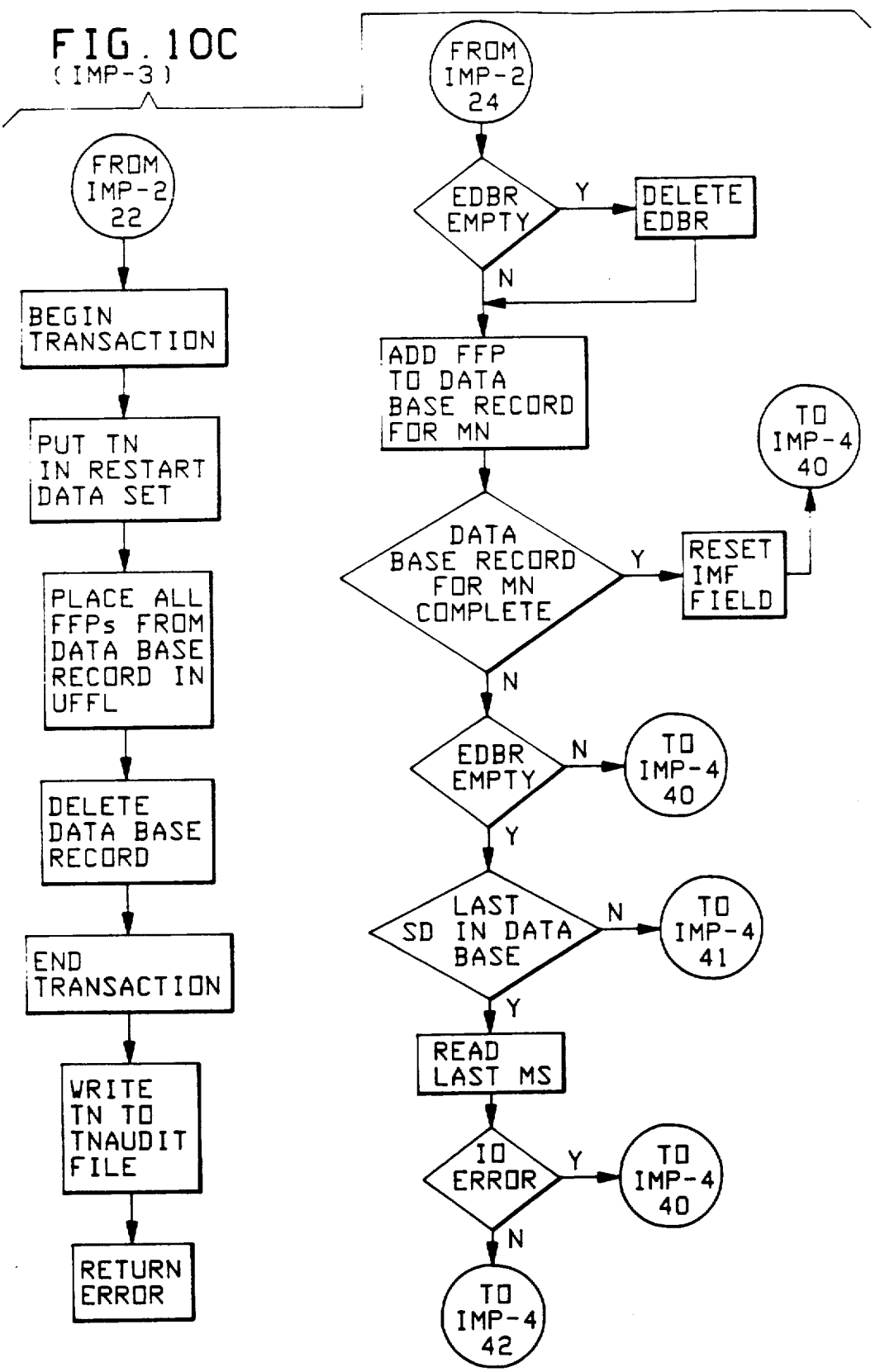

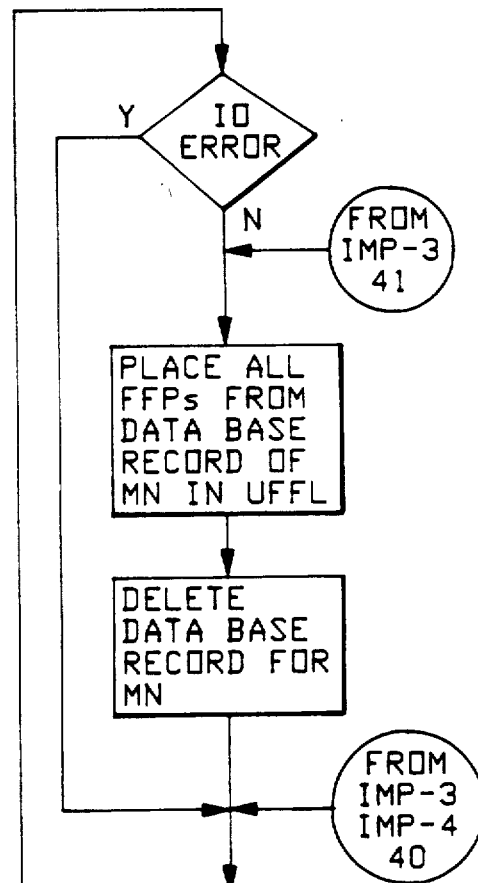
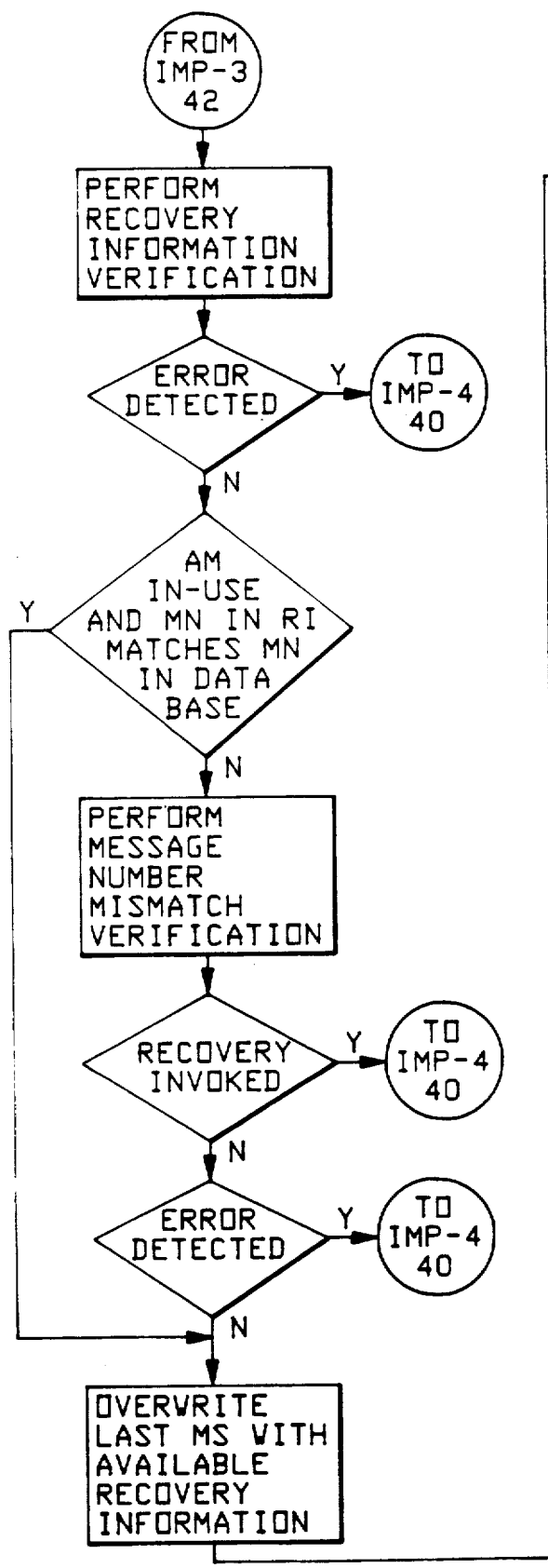
FIG.10D
(IMP-4)

(IMP-5)

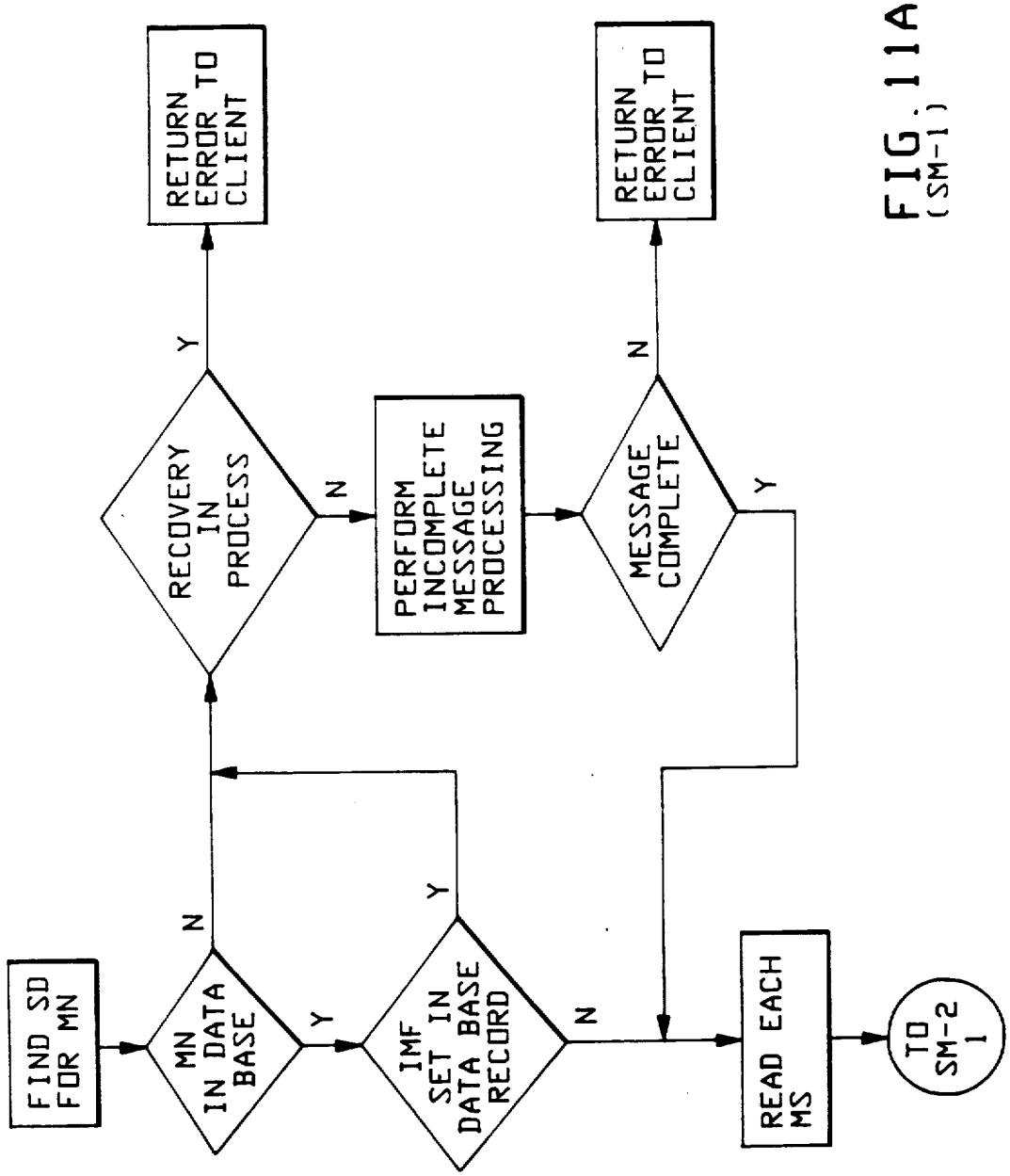
FIG. 11A (SM-1)

(SM-2)

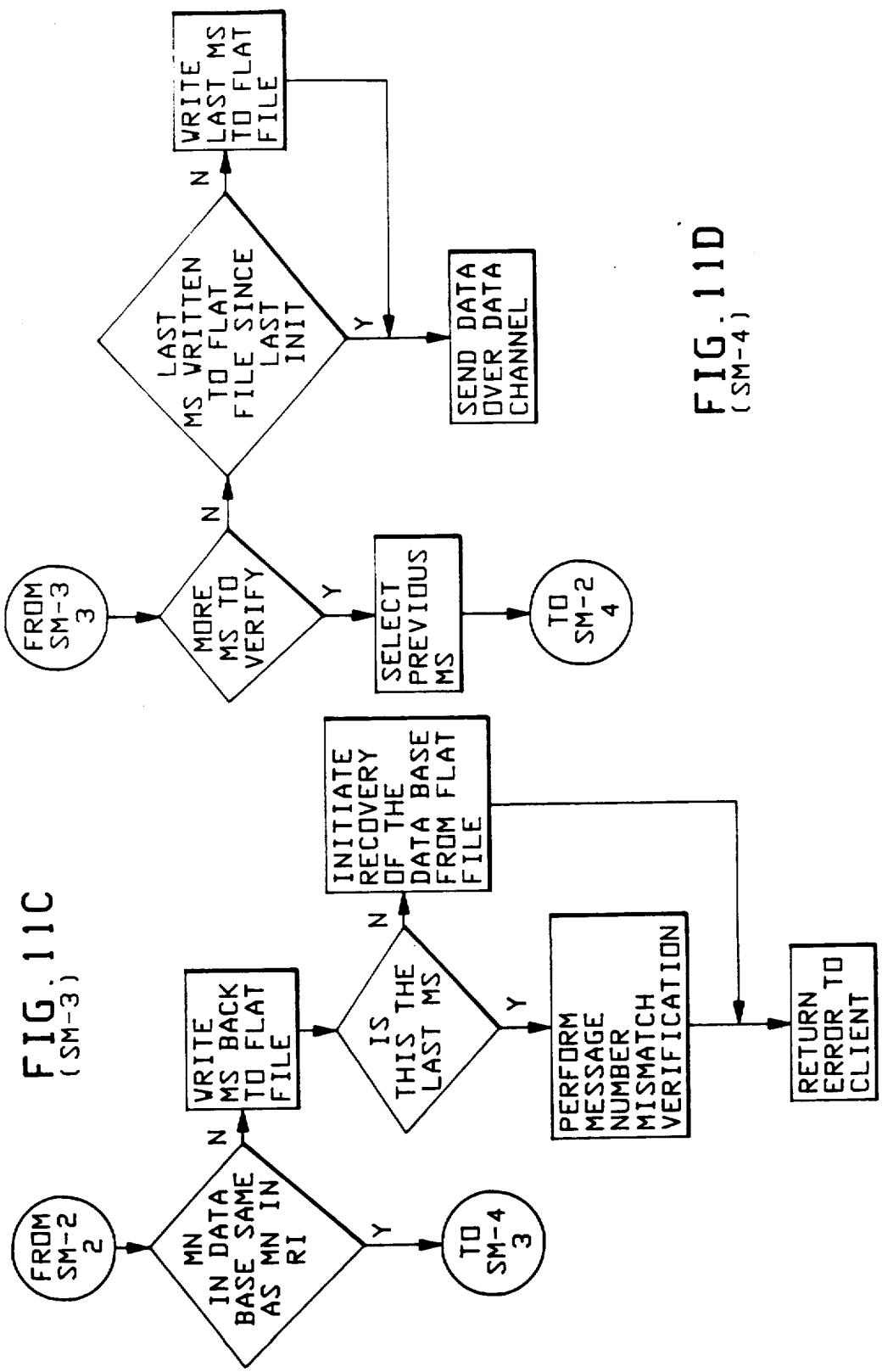
FIG. 11D (SM-4)
FIG. 11C (SM-3)

(RM-1)

(RM-2)

(RM-3)

(DM-1)

(DM-2)

(DM-3)

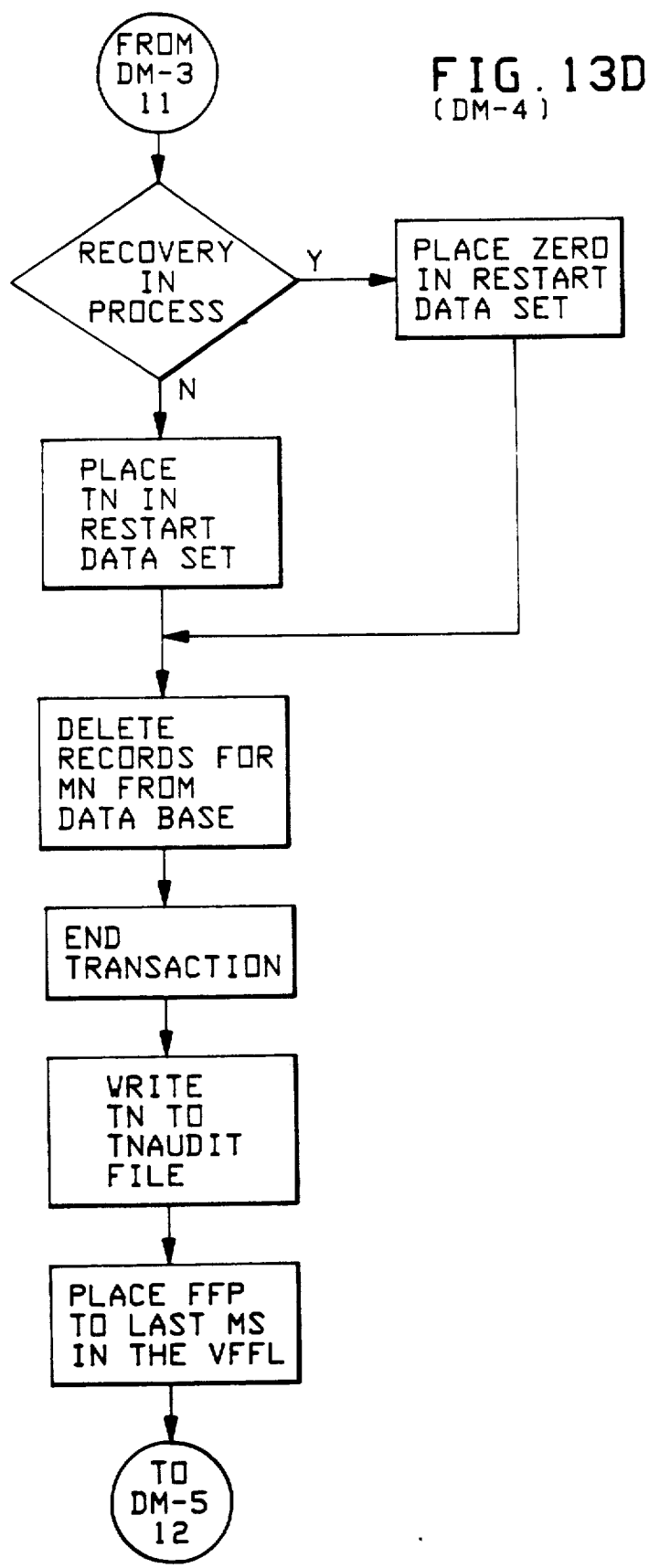
FIG. 13D (DM-4)

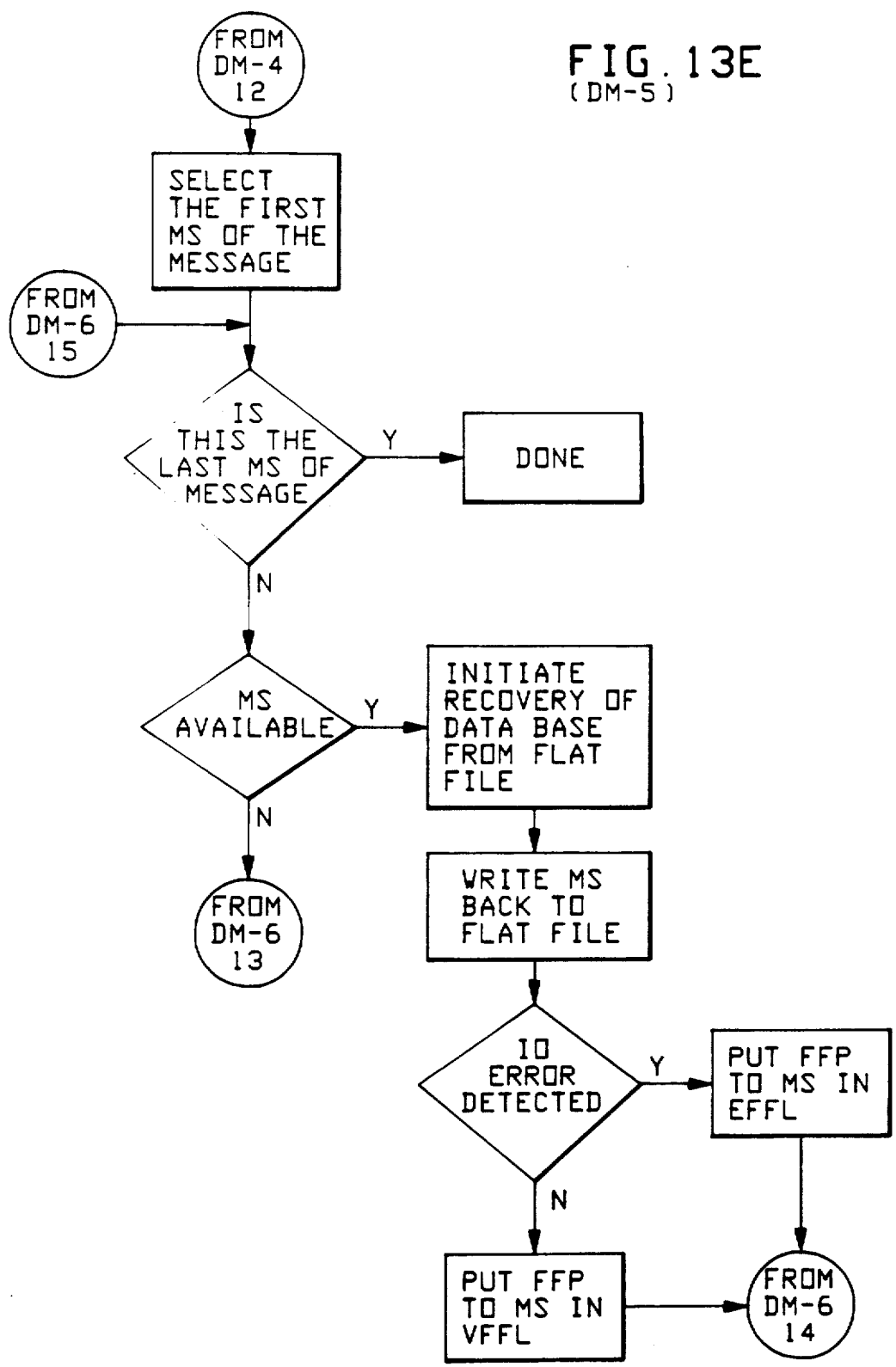

(DM-6)

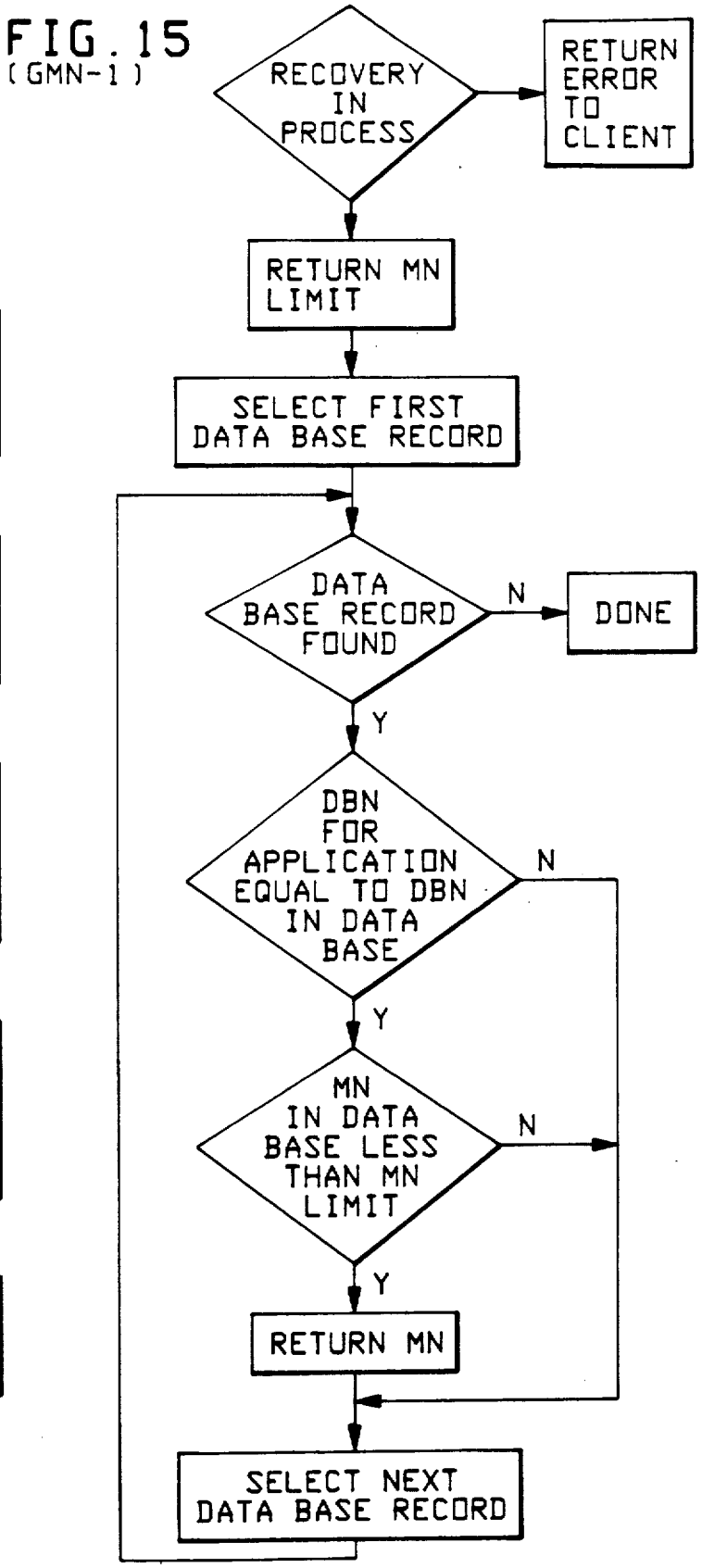
FIG. 15 (GMN-1)
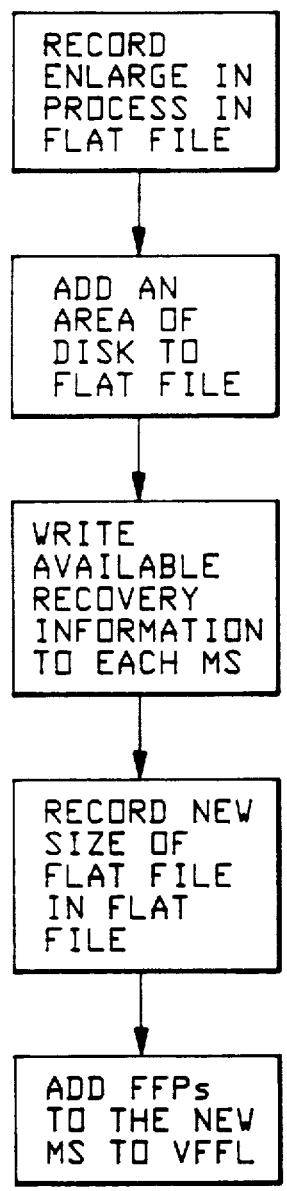
FIG. 14 (EFF-1)

(INIT-1)

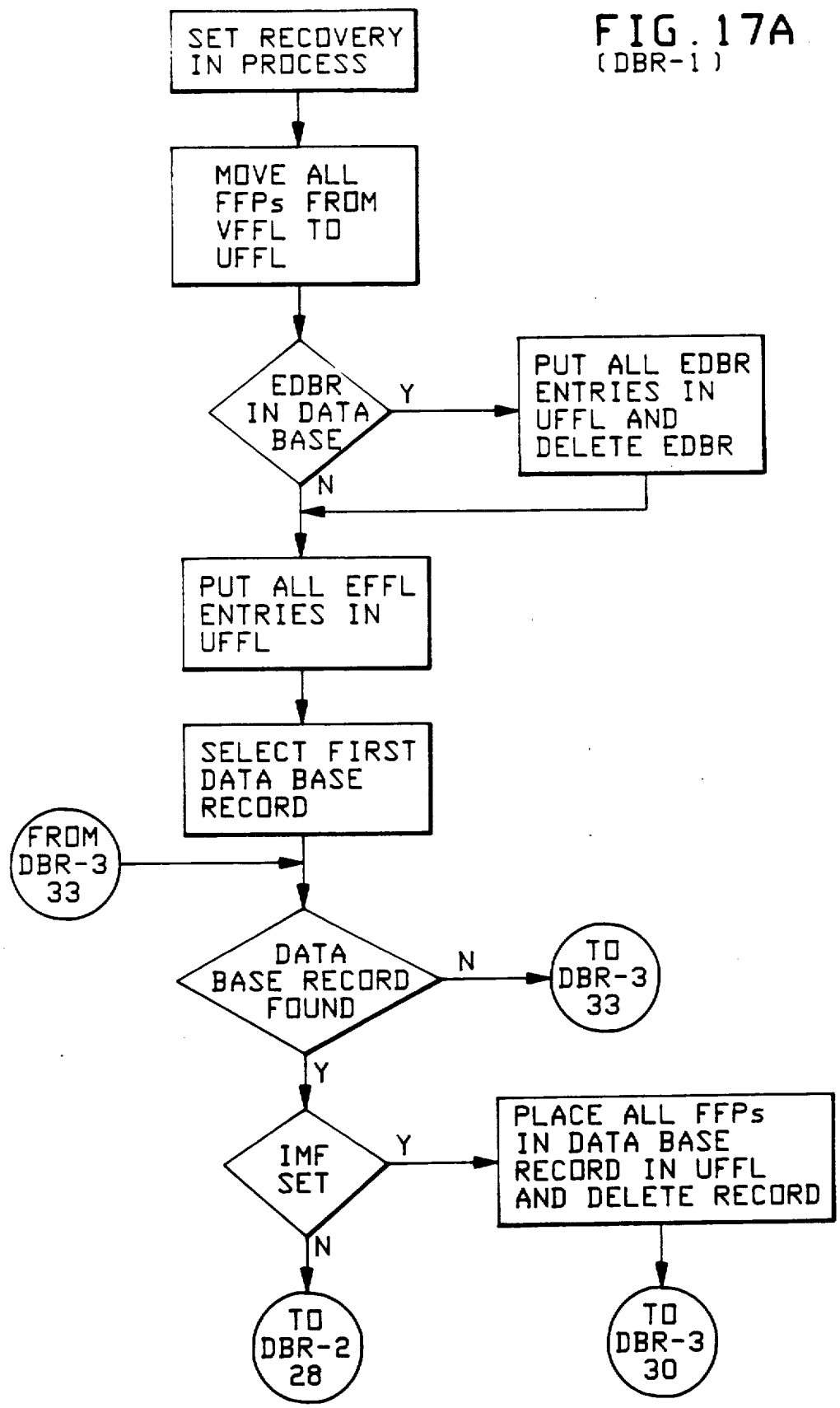

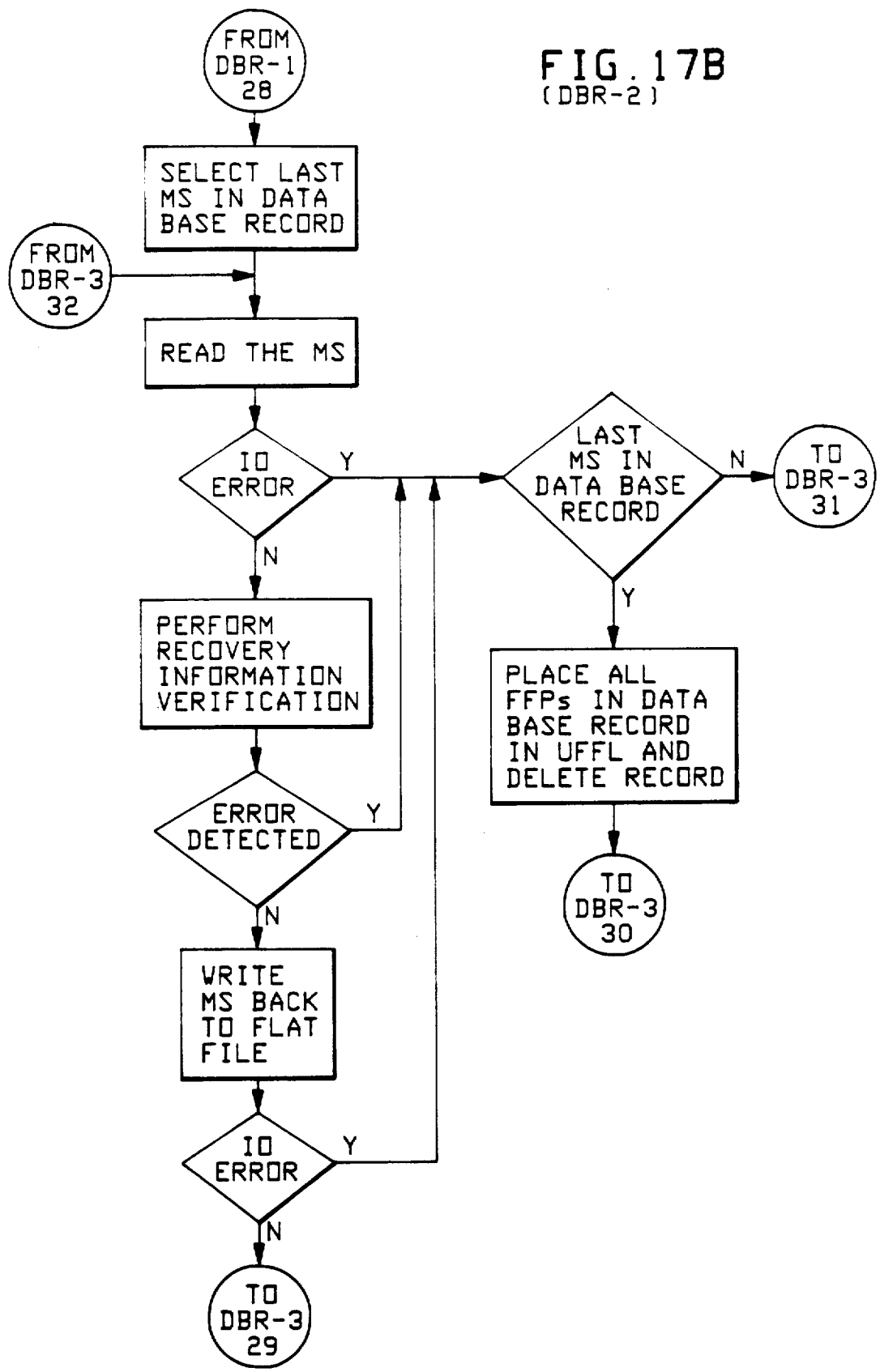

(DBR-3)

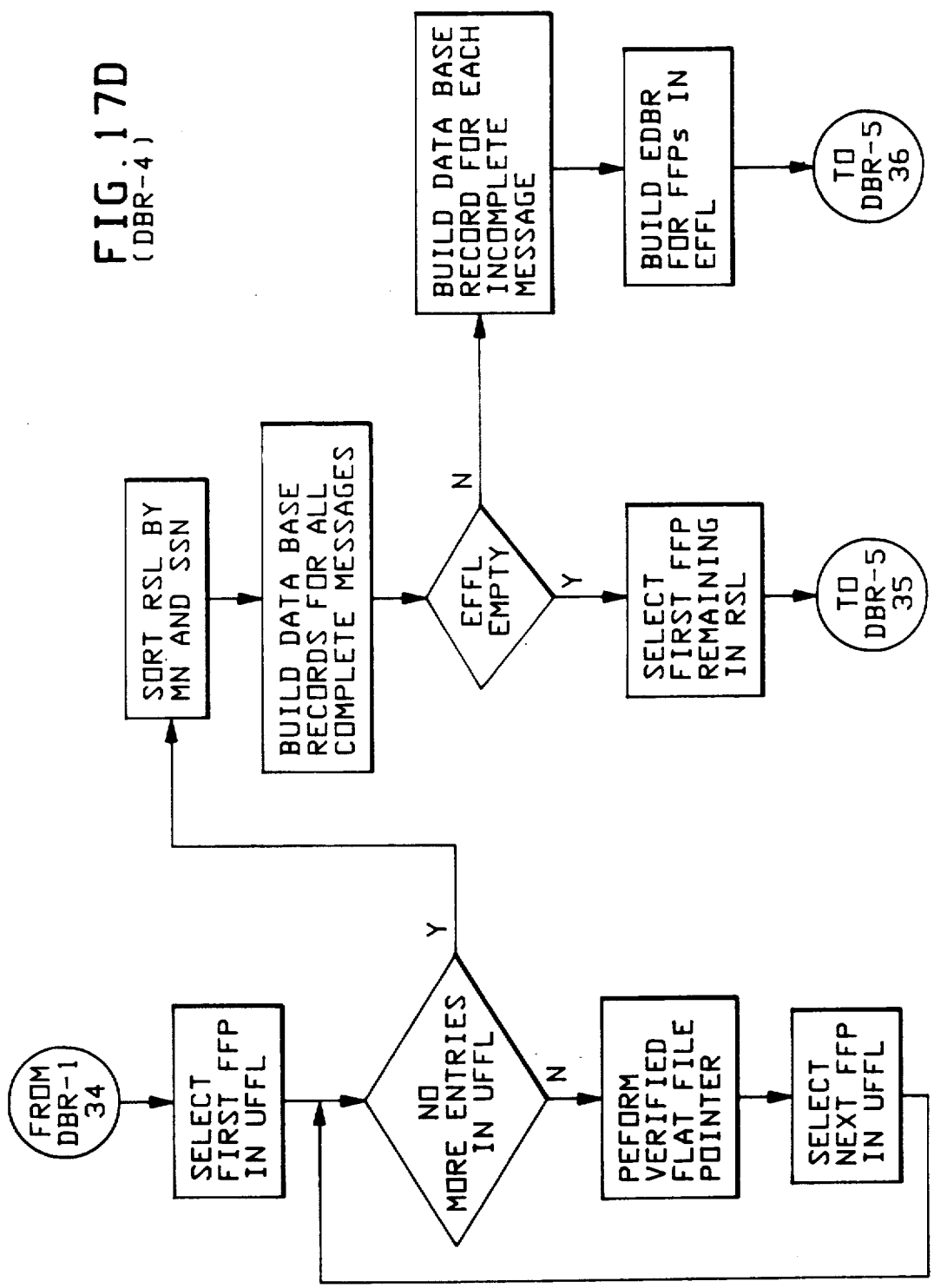

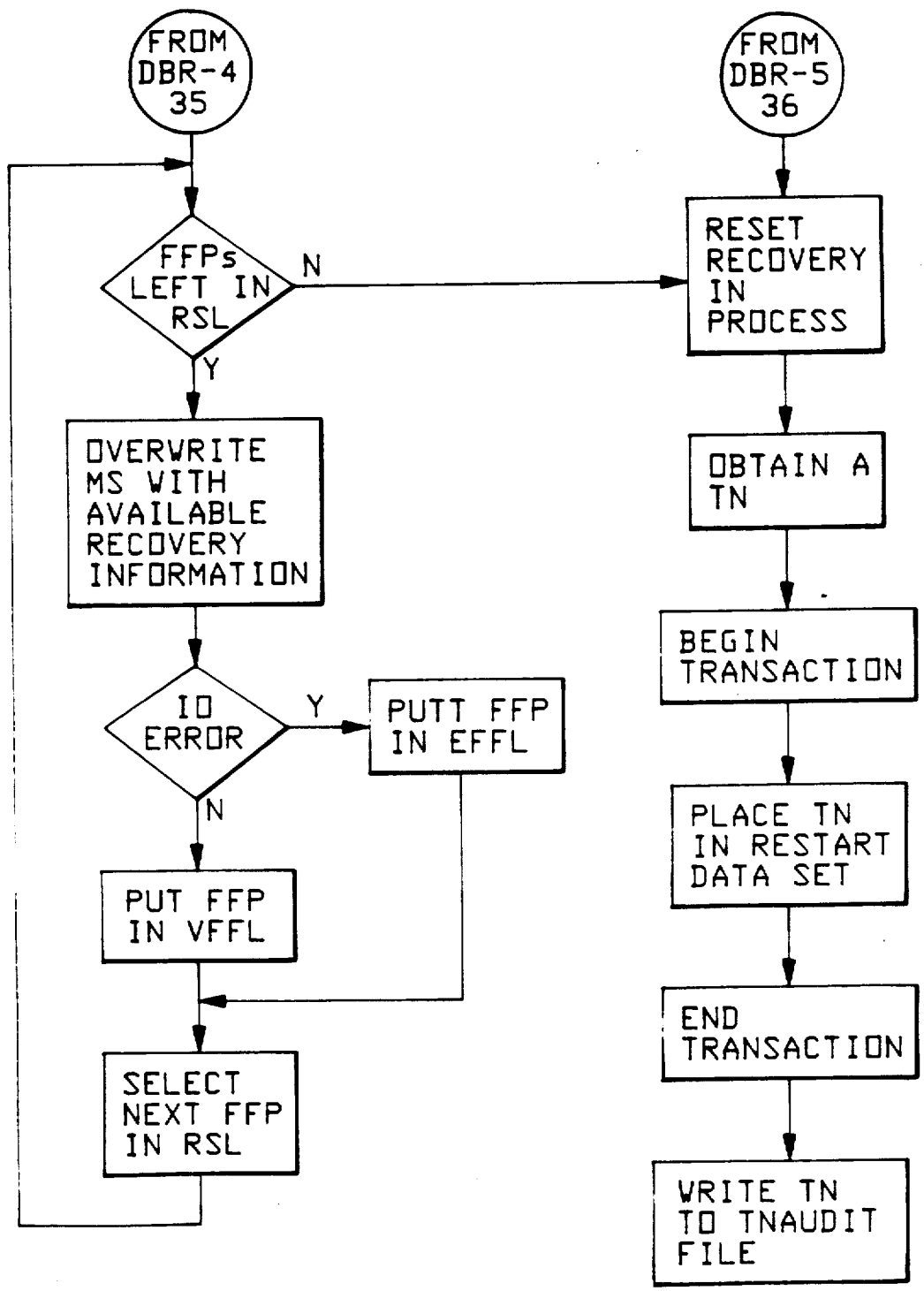
FIG. 17E (DBR-5)

APPARATUS AND METHOD FOR PROVIDING RECOVERABILITY IN MASS STORAGE DATA BASE SYSTEMS WITHOUT AUDIT TRAIL MECHANISMS

BACKGROUND OF THE INVENTION

1. Field of the Invention

The invention relates to mass data storage particularly with respect to system recoverability without utilizing audit trail mechanisms on the stored data. Specifically, the invention involves a method and apparatus whereby client applications operating in a digital computer system can store, retrieve and delete variable length packets of high volume, real-time data which cannot be archived because of volatility and cannot be audited because of volume. The invention is applicable to environments such as telephone voice messaging systems, manufacturing process control systems and laboratory data systems.

2. Description of the Prior Art

Requirements exist in the prior art for large volume data base systems that receive large numbers of variable duration data packets (referred to as Messages) in real-time and store the Messages to disk. Such systems require integrity and recoverability of the data in the event of a system interruption or I/O component failure. Once a client application of the system has been informed that a Message has been recorded, a system interruption or single I/O component failure must not result in loss of the message. A system of this type may involve the support of thousands of digital data channels where each channel is receiving or transmitting data in real-time at a rate of thousands of bytes per second. If all data channels are receiving data and writing the data to disk, the system may be required to provide a sustained throughput in excess of tens of millions of bytes per second.

Systems of this type must also retain Messages until they are deleted. Storage of hundreds of thousands of Messages, where each Message may be many thousand bytes in length, may be required Thus, such a system may be required to store tens of billions of bytes of data. When a client application requests that a Message be sent over a data channel, rapid response to the request is expected. For example, in a telephone messaging system, a request that a voice announcement be placed on a selected telephone line requires a real-time response in fractions of a second.

A prior art mechanization for effecting the above described requirements utilizes a data base with an audit mechanism that creates an audit trail of completed transactions. A structured data base is desirable because it provides rapid access to large volumes of data The audit trail provides protection from I/O component failures and system interruptions. The audit mechanism is implemented such that before each transaction is completed, records representing each altered data base record prior to and after an update are written to an audit file. In addition to the audit file, periodic dumps of the data base are effected where each record of the data base is saved. Thus, recovery can be effected from I/O component failures and system interruptions by utilizing the latest data base dump and the audit files.

For the environments described above which require recording high volume volatile data, the data base mechanization is not effective. In systems where the lifetime of typical Messages are less than 24 hours, nightly dumps of the data base do not provide any benefit. At the time of a failure, a large fraction of the Messages archived in the most recent dump will be obsolete. Additionally, in such real-time high data rate systems (in excess of 12 million bytes per second), implementing an auditing mechanism may not be practically realizable with present day peripheral devices. With an audit trail mechanism, the large amounts of data being processed must be sequentially written requiring writing to one peripheral in the I/O subsystem of the computer system. The state of the art in peripheral development is such that a cost effective peripheral device does not exist that is capable of absorbing data at the rate it is being processed so as to provide such an audit mechanism. Additionally, management of the audit media introduces prohibitively undesirably complex requirements.

Another approach in implementing a system of the type described above is a conventional ("flat") file on mirrored disk with a data base for an indexing or directory structure into the flat file. Such a flat file contains records utilized to store the Message data typically without an associated indexing structure. When records are written to a flat file, generally an audit trail is not created, thus obviating the above described disadvantages of audit mechanisms. However, data in a flat file is exposed to I/O component failures and system interruptions. In order to provide protection from isolated I/O component failures and system interruptions, two copies of the flat file are maintained with the copies of the file having no common I/O path or component with respect to each other. Routines which access the flat file consider both copies of the file as a single file When data is written to the file, both copies of the file are updated During reading operations of the flat file, data is read from a single file. If an error is detected while reading one copy of the file, the other copy can be utilized An I/O error will only be returned by the storage system if both copies of the flat file cannot be read. A file which is accessed in the manner described is referred to as residing on mirrored disk. Mirrored disk systems double the I/O demand during writing of records.

Utilization of mirrored disk can result in inconsistencies being introduced between the copies of the file. Such inconsistencies may, for example, be introduced in the following manner. A write operation is initiated to each copy of the file and updating of one file is completed. The system is interrupted prior to writing the information to the other copy of the file. When the system is reinitialized, an inconsistency will exist between the two copies of the file.

Normally, a flat file on mirrored disk does not provide an indexing structure to permit rapid access to the recorded data. In order to provide rapid access to the data, a combination of a data base and a flat file on mirrored disk could be utilized The data base provides the capability of efficiently accessing Messages utilizing a key. The data base would contain data comprising the record numbers in the flat file corresponding to each segment associated with a Message. An audited data base can be utilized because the records in the data base are small. The data base audit mechanism provides protection from I/O component failures.

Using a data base for an indexing or directory structure and a flat file on mirrored disk for data storage results in a number of desirable advantages. The data base provides rapid access to the segments associated with a Message. The mirrored flat file provides protection from I/O component failures and system interruptions without the disadvantages described above of an audit mechanism concentrated on a single peripheral device. It is appreciated that, although additional I/O operations are required when storing Messages, the I/O operations are distributed over the entire disk subsystem thereby permitting simultaneous writes. It is also appreciated, that the additional I/O operations to the flat file ar less than the I/O requirements for an audited data base as described above.

The processing method described, introduces an environment where the data base could be inconsistent with the flat file or where the flat file could be rendered inoperative. If the data base is rolled back (its logical state moved back in time) by applying images from the data base audit file, which images represent records prior to data base updates, or if the data base cannot be completely recovered from the audit file after failure or interruption, the flat file will be inconsistent with the data base. If this occurs, incorrect records in the flat file could be used or overwritten. Data base roll back is a commonly performed operation for the purpose of correcting logical errors such as those caused by a program that was run with incorrect input or that processed records in the data base incorrectly. Additionally, if the data base is irretrievably destroyed, the remaining flat file is rendered useless. Furthermore, if write operations to the flat file are interrupted by a system failure, the two copies of the flat file will be rendered permanently inconsistent with respect to each other. Also, a Message will become "orphaned" (permanently allocated but unknown to any client) if the Message is received and stored but the system is interrupted before a client application has recorded the existence of the Message in the data base of that client. The system will be unable to store additional data if enough Messages become orphaned.

SUMMARY OF THE INVENTION

The above disadvantages of the prior art are obviated by utilizing a flat file and an associated data base for access thereto, both controlled by a processor system executing algorithms stored in memory coupled to the flat file, data base, and processor system. Each Message data segment stored in the flat file has Recovery Information (RI) stored therewith that permits recovery of the data base if the data base becomes inconsistent with the flat file. The RI is also utilized to detect data base inconsistency and to verify integrity of the Message segments stored in the flat file. Preferably, the flat file resides on mirrored disk. In such case, the invention tolerates and repairs inconsistencies that may exist between data copies. The invention further includes a Transaction Number (TN) audit file for creating a permanent independent record of the transaction number of the most recent transaction performed with respect to the data base. The TN audit file is utilized to detect inconsistencies between the data base and the flat file. The RI and TN audit file are utilized to continuously monitor for inconsistencies between the data base and the flat file. When an inconsistency is detected, the data base is recovered from the RI. The recovery can proceed while the data base and flat file are accessible and continually updated. Data base inconsistency monitoring is predicated on assigning Message Number (MN) identifier Tokens to the Messages, which Tokens are unique over the expected lifetime of the system embodying the invention. Each Token is comprised of a high order component and a low order component. The Tokens are preferably generated from a master Token, the high order component of which is incremented and stored to disk when the low order component overflows and each time the system is initialized. The low order component is incremented by one in order to generate each successive Token. Information stored in the data base also permits reconciliation of client data bases with the server data base in order to identify "orphaned" messages.

BRIEF DESCRIPTION OF THE DRAWINGS

FIG. 2 is a schematic diagram illustrating the data base structure utilized in implementing the present invention.

FIG. 3 is a schematic diagram illustrating the flat file structure utilized in implementing the present invention.

FIGS. 4–17E are flow chart diagrams of routines utilized in the Message Management Module of the system of FIG. 1.

Figure 1:
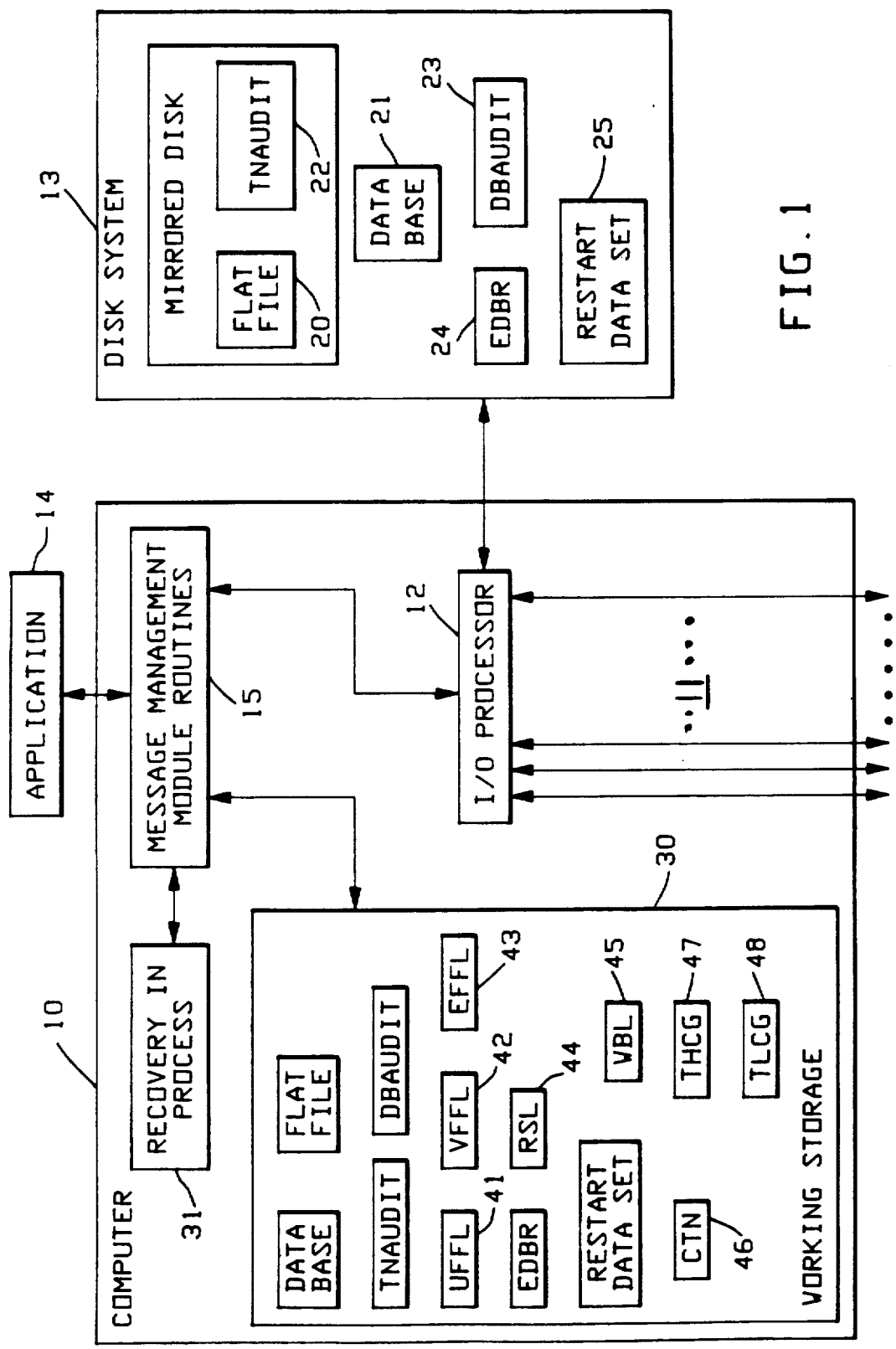
FIG. 1 is a schematic block diagram of a system implemented in accordance with the present invention.

DESCRIPTION OF THE PREFERRED EMBODIMENT referring to FIG. 1, a schematic block diagram of a system implemented in accordance with the present invention is illustrated. A computer system 10 transmits and receives high volume, real-time data to/from data channels 11 across a suitable interface (not shown). The computer system 10 includes an I/O processor subsystem 12 for transmitting and receiving the data to/from the data channels 11 and includes a disk system 13 intercoupled for two-way communication with the I/O processor 12. The disk system 13 preferably includes mirrored disk for reasons to be discussed. Systems for use as the elements 10, 12 and 13 are commercially available from Unisys Corporation of Blue Bell, Pa., as the A-Series computer systems. A client application 14 is illustrated resident on the computer system 10. The application 14 requires receiving high volume, real-time data from selected data channels 11; storing the data on the disk system 13; retrieving the data from the disk system 13 for transmission over selected data channels 11 and deleting data from the disk system 13. The computer system 10 includes a Message Management Module of routines 15 utilized to manage the message data in a manner to be described in detail with respect to FIGS. 4–7. The application 14 sends commands to the routines 15 for effecting the functionality required by the application 14 and for managing the data base with respect to the received and stored data. The routines 15 return information to the application 14 such as message number identifiers of messages stored on the disk system 13 and error messages in response to system anomalies. The routines 15 are coupled for two-way communication with the I/O processor 12 for controlling reading and writing of the disk system 13 and receiving and transmitting data with respect to the data channels 11.

A flat file 20 resides on the mirrored disk portion of the disk system 13 for storing the actual message data along with Recovery Information (RI) to be further described with respect to FIG. 3. The routines 15 manage a data base 21, residing on the disk system 13, for providing rapid access to stored messages in the flat file 20. The structure of the data base 21 will be described with respect to FIG. 2. In operation of the invention, the routines 15 also maintain the following files, lists and records on the disk system 13: a Transaction Number Audit file (TNAUDIT) 22 (on mirrored disk), a Data Base Audit file (DBAUDIT) 23, an Error Data Base Record (EDBR) 24, and a Restart Data Set 25. The functionality and operation of the files, and records 22-25 will be described with respect to FIGS. 5-17. The computer system 10 includes working storage 30 in main memory for updating and managing the components 20-25 on the disk system 13. A Recovery In Process item 31, which is boolean, is included to indicate that the data base 21 is in the process of being recovered from the flat file 20. The following lists are also maintained in working storage 30: an Unverified Flat File List (UFFL) 41, a Verified Flat File List (VFFL) 42, an Error Flat file List (EFFL) 43, a Retained Message Segment List (RSL) 44, and a Write Back List (WBL) 45. Also included in working storage 30 are a Current Transaction Number item (CTN) 46, a Token High Component Generator (THCG) 47, and a Token Low Component Generator (TLCG) 48; all of which are integer. The functionality and operation of the lists and records 41-48 will be discussed with respect to FIGS. 4-17. The requirement to perform the recovery function is detected by the routines 15 utilizing RI and TNAUDIT in a manner to be described with respect to FIGS. 4-17.

Referring to FIG. 2, the structure of the data base 21 is illustrated. The data base 21 is utilized to provide rapid access to stored data in the flat file 20 and functions as a directory or access structure for the data contained in the flat file 20. Associated with each data Message is a data base record (or group of records) which designates those Message Segments (MS) in the flat file 20 which comprise the Message. Associated with the data base 21 is an audit file 23 (FIG. 1) that provides for recovery of the data base 21 in the event of a system interruption or I/O component failure. Each record in the data base 21 is comprised of the following fields: Message Number (MN), Sequence Number (SN), Segment Counter (SC), DB Number (DBN), Incomplete Message Flag (IMF), and Segment Descriptors (SD).

The MN, otherwise referred to as a Token, is utilized to identify and access Messages. When a Message is received by the system, a unique MN is created and returned to the client application 14. Details of MN generation will be described with respect to FIG. 4. The SN is utilized when a Message is received that requires more MS than the maximum number of SD in a single data base record. The SC indicates the number of Message Segments (MS) in a Message. The DBN is utilized to associate this Message with a particular client 14. The IMF indicates that the Message was not fully reconstructed during recovery of the data base 21 from the flat file 20 because of I/O errors. The set of SD describes records in the flat file 20. Each SD contains a Flat File Pointer (FFP) which contains an address (record number) of a MS in the flat file 20 and a field (not shown) which indicates the number of bytes in the MS.

In addition to records of the format specified with respect to FIG. 2, a Restart Data Set 25 is logically (and in practice physically) in the data base 21. The set of records 25 is utilized after a system failure and each record thereof contains a Transaction Number (TN). Each time a Message is created or deleted, a TN is generated by incrementing CTN 46 and stored in DBAUDIT 23 along with the data base records which have changed. After a system failure and subsequent data base recovery utilizing DBAUDIT, the TN of the most recent data base transaction can be recovered from a record in the Restart Data Set 25. Changes to the data base 21 are delimited by operations referred to as Begin Transaction (BT) and End Transaction (ET). The group of data base changes between the BT and ET constitute a single logical change to the data base 21. Therefore, only after the ET is executed, all data base changes between BT and ET are committed. The data base management algorithms required to ensure atomicity and recoverability of data bases such as that described herein are commonly available, and generally include mechanisms similar to DBAUDIT and Restart Data Set.

Referring to FIG. 3, the structure of the flat file 20 is illustrated. A Message is comprised of Message Segments (MS) each MS being stored as a record in the flat file 20 at an address identified by the corresponding SD. All MS are the same size; however, the amount of data contained in a MS is variable though limited by the size of the MS. The flat file 20 is maintained on the mirrored disk system 13. The data base 21 need not reside on mirrored disk. The flat file 20 stores the pieces of data (MS) comprising the Messages. Each MS in the flat file 20 is formatted as illustrated in FIG. 3 to contain Received Data and Recovery Information (RI).

The RI is utilized to provide data integrity and to recover the data base 21 in the event it is damaged beyond the ability of the normal data base management algorithms to recover. The RI is stored in fields in the flat file records and comprises the following data items: an Available Marker (AM), a Self Pointer (SP), a Message Number (MN), a Segment Sequence Number (SSN), a Data Base Number (DBN), a Final Flag (FF), a Length (L), a Last Address (LA), and a Checksum (CS).

The AM is utilized to indicate whether a MS is in-use or available. The SP contains the flat file address of the containing MS and is utilized to detect disk subsystem errors. The SP should agree with the SD for the same MS. The MN indicates to which Message the MS belongs. Before a MS is used, verification is performed to ensure that it belongs to the message indicated by the data base 21. The SSN indicates the order in which the Message Segments were received. The DBN indicates which client owns the MS. The FF indicates that the MS is the last MS of a Message. The Length indicates the number of valid bytes in the Message. The LA points to the last MS of a Message. The CS is computed for the entire RI except the CS and is utilized to verify the integrity thereof.

When a read or write operation to a disk unit fails, the remaining disk unit of the mirrored set is used. However, the data on the remaining disk unit is now exposed to a failure. Therefore, it is necessary to establish another member for the mirrored set. After the apparatus is provided with a new disk unit, records from the remaining disk unit are copied to the new disk unit, thus allowing the flat file 20 to remain mirrored.

With continued reference to FIGS. 2 and 3, the relationship of the data in the data base 21 and the flat file 20 is depicted. Message Number 100 consists of three Message Segments and was recorded for a client which has been assigned DBN one. The Message Segments associated with Message Number 100 are located in the flat file at addresses 2, 4 and 6. Message Number 200 consists of seven Message Segments and was recorded for a client which has been assigned DBN two. The Message Segments are located in the flat file at addresses 1, 3, 5, 10, 11, 13, and 15. Message Segments 1, 2, 3, 4, 5, 6, 10, 11, 13 and 15 are in-use and all other Message Segments are available. Each of Message Segments 6 and 15 is the last MS of a Message. Thus, it is appreciated that messages are stored in the flat file 20 which are pointed to by records in the data base 21.

In order to guarantee that the data base 21 and the flat file 20 are consistent with respect to each other, the Transaction Number Audit (TNAUDIT) file 22 is utilized. Each update transaction against the data base is assigned a TN generated by incrementing CTN 46. The TN is stored in the data base Restart Data Set 25 and then, after the transaction is committed but before returning a result to the client, written to TNAUDIT. During initialization, verification is performed to ensure that the TN in the data base 21 is greater than or equal to the TN from TNAUDIT. Otherwise, it is assumed that the data base 21 is obsolete and, therefore, recovery of the data base 21 from the flat file 20 is initiated.

Each TN need not be written to the TNAUDIT file 22. Instead, only the largest TN of a given group of update transactions need be written. For example, if three transactions have been committed to the data base 21 with TN 10, 11 and 18, only TN 18 needs to be written to the TNAUDIT file 22. Moreover, if an update transaction is committed and the last TN written to the TNAUDIT file 22 is larger than the TN assigned to the update transaction, there is no need to write the TNAUDIT file 22.

Furthermore, the TNAUDIT file comprises multiple records, each on a different disk. These records are written cyclically. Thus, writes to TNAUDIT are distributed over multiple disks.

The flat file 20 and TNAUDIT file 22 are maintained on mirrored disk 13 which reduces the possibility of an I/O error. However, an I/O error can occur if both copies of the file fail. Unless otherwise stated, I/O errors will result in an error indication being returned to the client.

It is appreciated from the foregoing, that the system of the present invention receives, stores, retrieves, sends, and deletes high volume, real-time data. The apparatus manages the data base 21 that provides rapid access to stored Messages and the flat file 20 on mirrored disk 13 that stores the actual data. Utilizing the data base 21, the flat file 20, TNAUDIT 22 and the RI, the system of the invention provides the following capabilities: storing high volume real-time data which cannot be dumped because of volatility and cannot be audited because of volume; rapidly retrieving stored data and deleting stored data; detecting and correcting inconsistencies which exist between the data base 21 and the flat file 20; rebuilding the data base 21 from the flat file 20 while Messages are being stored, retrieved and deleted; automatically detecting when rebuilding of the data base 21 from the flat file 20 is required; resolving mirrored disk inconsistencies which may exist; and resolving inconsistencies which may exist between the data base 21 and data bases of client applications of the system. The invention provides recoverability of the data, with no loss thereof, in the event of a single I/O component failure or system interruption. The invention permits applications utilizing the system to refer to the variable length data packets by a fixed length Token (MN).

Figure 4:
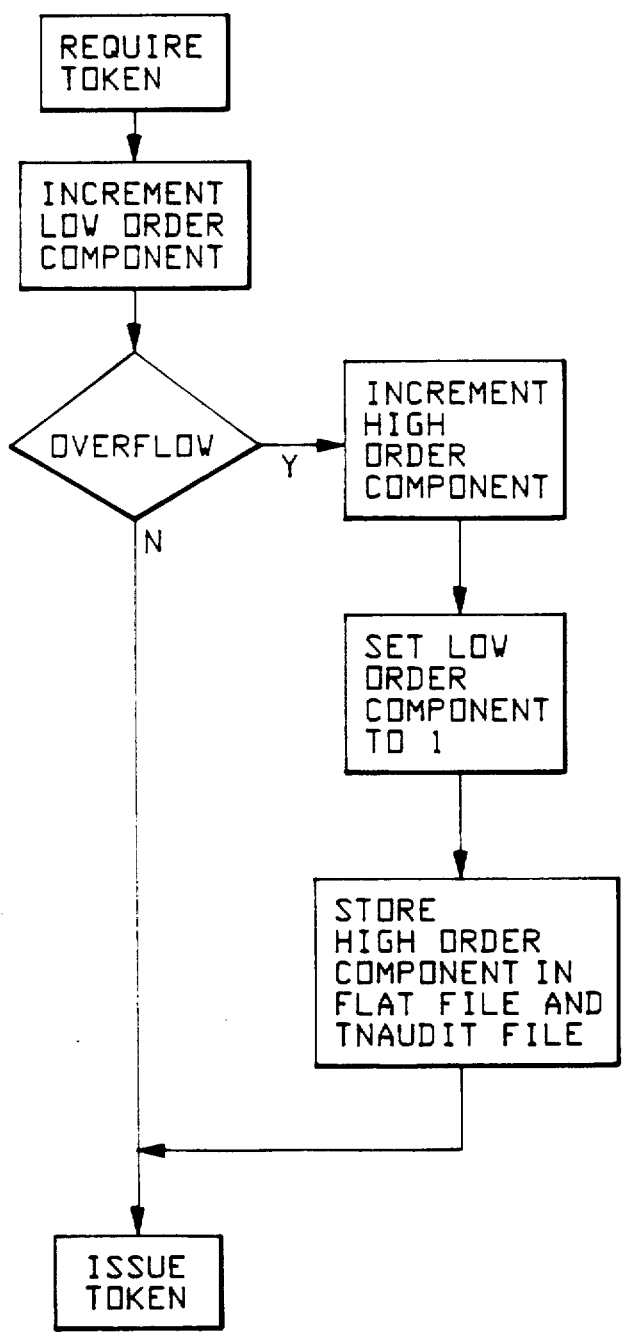
Figure 4A:
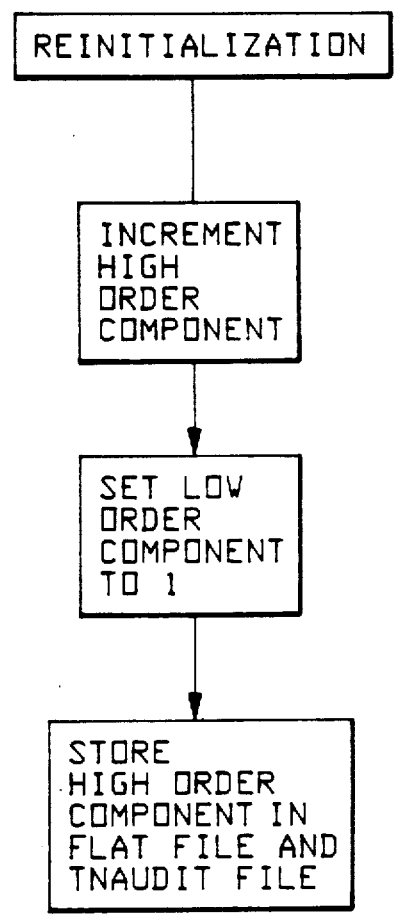

FIGS. 4-17 contain flow charts detailing the operations of the Message Management Module routines 15 in performing the operations in accordance with the invention. Referring to FIG. 4, a flow chart depicting the manner in which the Tokens or Message Numbers (MN) are created and managed is illustrated. A MN is used to access Messages and is created when a Message is received. The MN is returned to the client. A MN is unique over the expected lifetime of the system and is generated from a master Message Number consisting of a high-order component (THCG 47) and a low-order component (TLCG 48). Each time the apparatus is initialized, the high-order component is incremented by one and the low-order component is set to one. The low-order component is incremented by one as each Message is created. If the low-order component is incremented past its maximum value, the high-order component is incremented by one and the low-order component set to one. The high-order component is stored in a reserved location in the flat file 20 and written to the TNAUDIT file 22. When the apparatus increments the high-order component due to low-order component overflow, it does not use the incremented value until that value has been successfully recorded in both the flat file and the TNAUDIT file. THCG 47 and TLCG 48 (FIG. 1) are utilized in the above operations.

Figure 16:
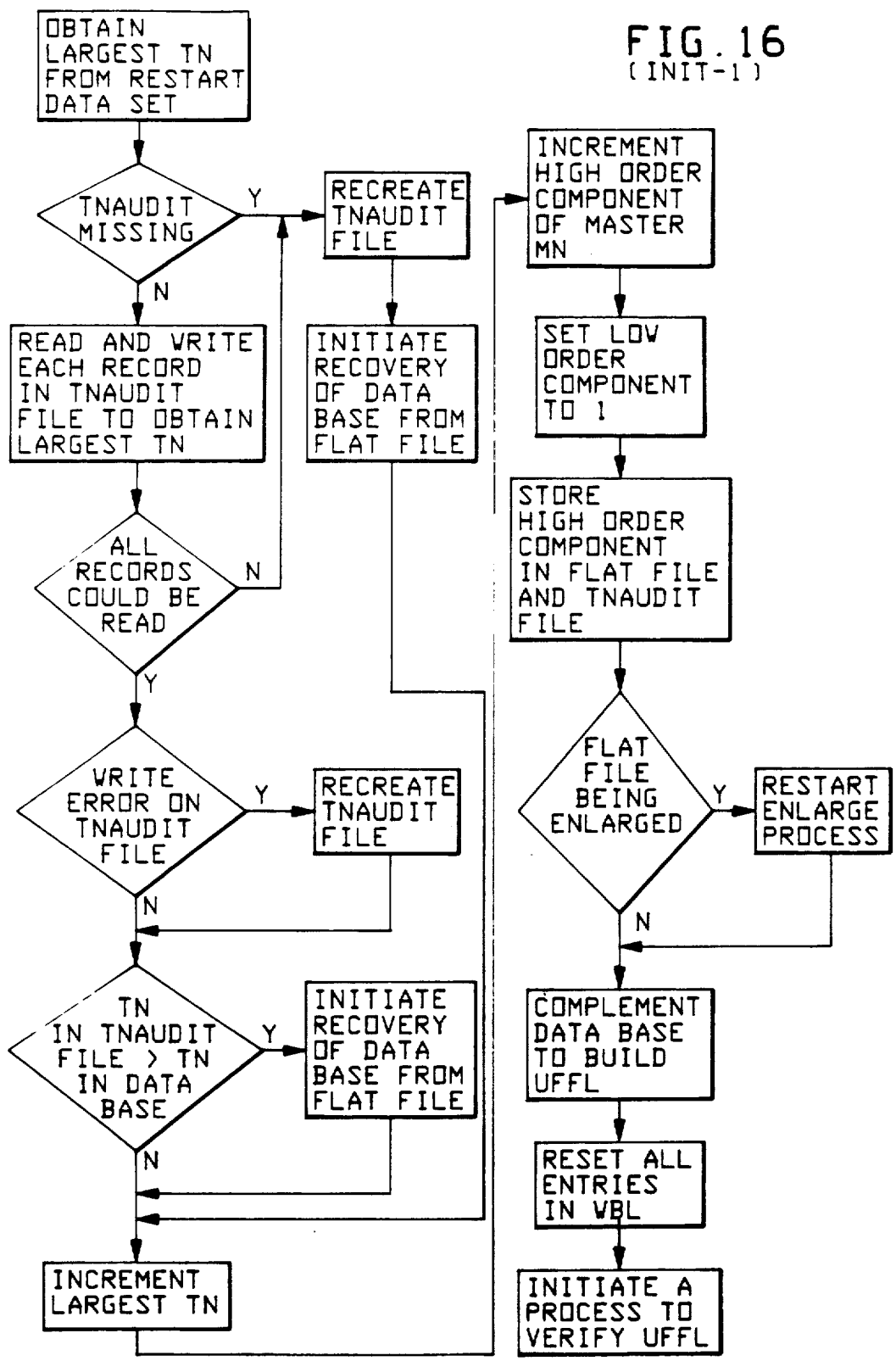
Figure 17C:
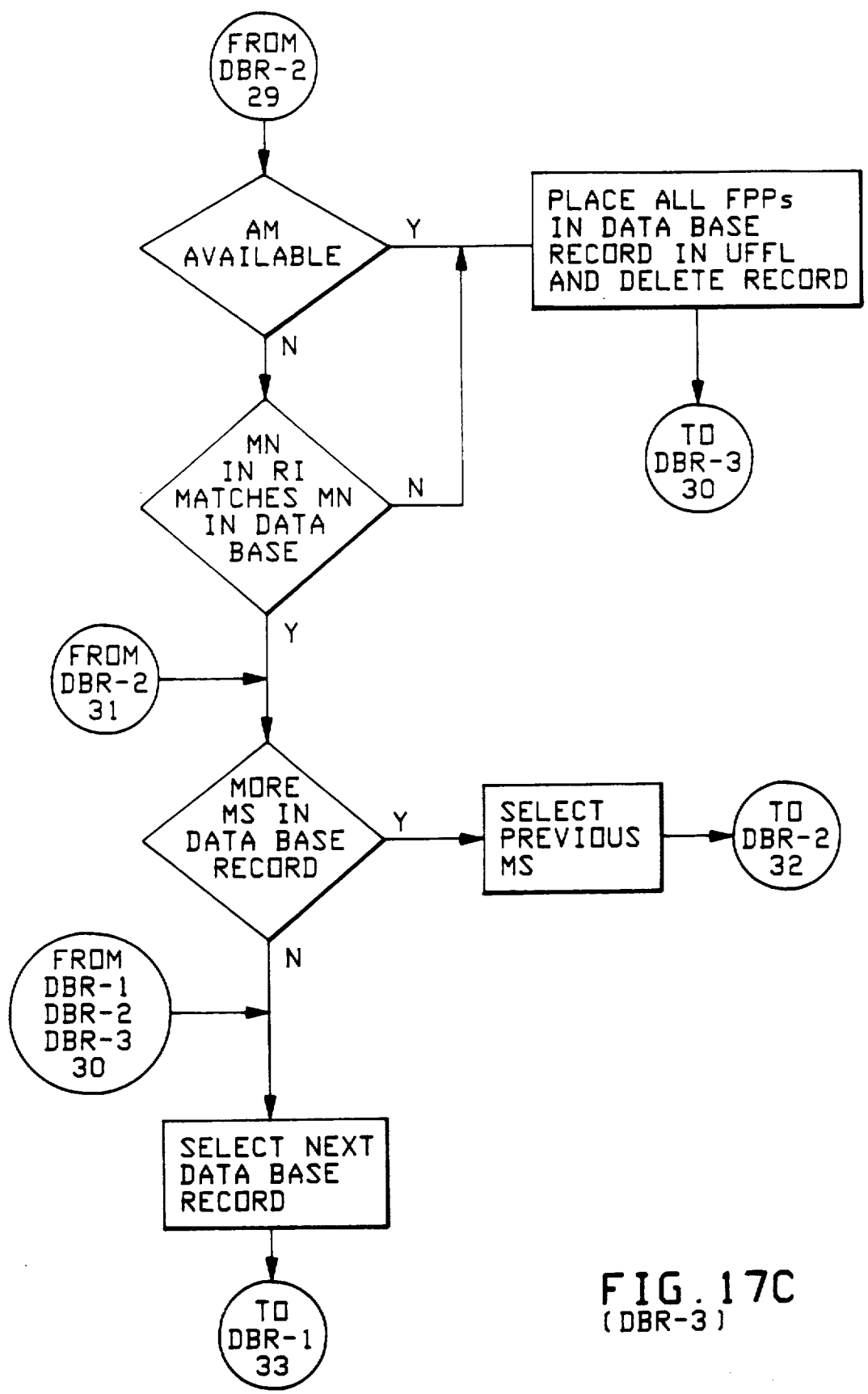

With respect to the flow charts of FIGS. 5-17, a flow chart that spans several sheets is denoted by a common figure number with alphabetical extensions to denote the various sections of the flow chart. FIGS. 5-10 define operations performed by the routines 15 in managing the data base 21 and flat file 20 and in executing commands received from the application 14 (FIG. 1). FIGS. 11-15 detail the commands in the repertoire of the Message Management Module 15 for performing message management on behalf of the client application 14. FIG. 16 details the initialization procedure performed by the apparatus and FIG. 17 details recovery of the data base 21 from the flat file 20. The following descriptions are in structured English and parallel the referenced flow charts. Arabic numerals are utilized to distinguish the logical levels of the flow chart operations.

Figure 5:
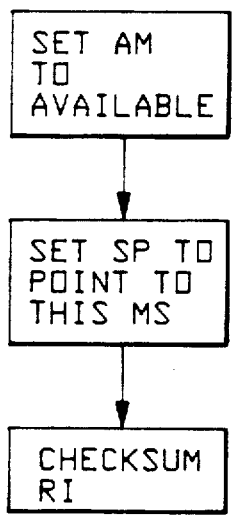

Referring to FIG. 5, the operations for setting a MS to Available Recovery Information is illustrated. When a MS in the flat file is not in use, the RI contains Available Recovery Information which comprises the following information.

1. The AM is set to "available". If the CS and SP are correct, this is the only item that needs to be tested to determine if a MS is available.
1. The SP is a FFP that points to this MS.
1. The CS contains a checksum of the RI.

Figure 6:
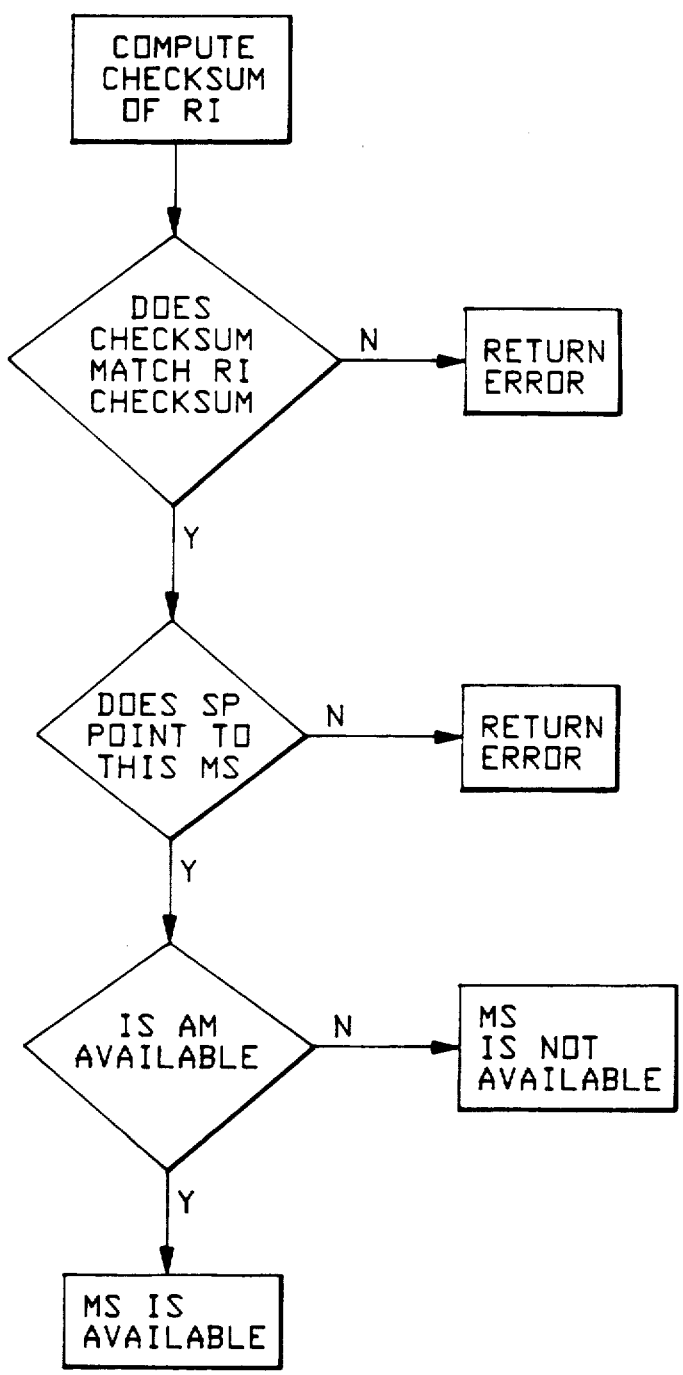

Referring to FIG. 6, the operations for determining if a MS has Available Recovery Information is illustrated. An MS is determined to be available by the following steps.

1. Checksum the RI in the MS.
1. If the checksum does not match the CS in the RI, return an error.
1. If the SP is incorrect (does not point to this MS), return an error.
1. If AM is "available", this MS is available. Otherwise, this MS is not available.

Referring to FIG. 7, the operations for verification of Recovery Information are illustrated. Recovery Information Verification consists of the following steps.

1. Checksum the RI in the MS.

1. If the checksum does not match the CS in the RI, return an error.
1. If the SP is incorrect (does not point to this MS), return an error.

Figure 8C:
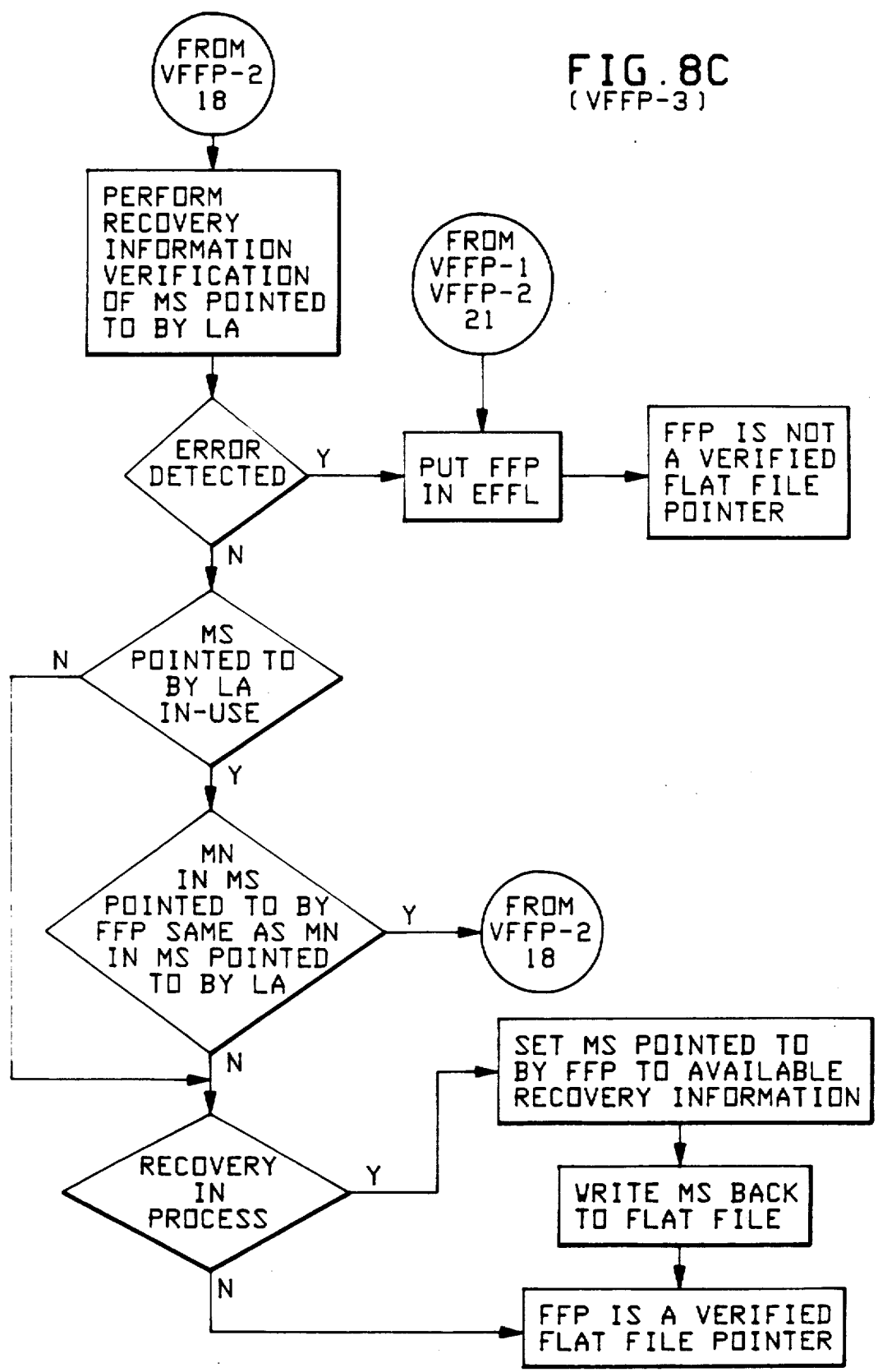

Referring to FIGS. 8a–8c, the operations for determining; if a Flat File Pointer (FFP) is Verified of Unverified are illustrated and described in structured English below. A list of unverified FFPs, which is referred to as the Unverified Flat File List (UFFL) 41 (FIG. 1), is constructed during initialization by complementing the data base; that is, the entire flat file is assumed to be available except those Message Segments referenced by entries in the data base. Before data is written to a MS pointed to by an entry in the UFFL, the MS is verified to ensure that it is either marked available or is marked in-use but is not a component of an intact Message (the referenced last MS is read to verify that it is not a valid last segment for the same message). Thus, use of an obsolete or incorrect data base cannot cause valid messages to be overwritten.

A FFP is said to be "Verified" if the location in the flat file specified by the FFP has been read or written since the most recent initialization of the apparatus and the most recent operation on that location was either a write of an available MS or a read that returned an available MS.

Throughout this discussion, if an I/O error occurs, the FFP being verified can not be used and is placed in the Error Flat File List (EFFL) 43 (FIG. 1). The EFFL contains a list of FFPs which can not be used due to I/O errors. The following parallels FIGS. 8a–8c.

1. Remove a FFP from the UFFL. For the purpose of this discussion, the FFP obtained from the UFFL is called TBV (To Be Verified).
1. If Recovery In Process is set, read the entire MS. Otherwise, read the RI for TBV.
1. Perform Recovery Information Verification. If an error is returned TBV can not be used and is placed in the EFFL.
1. If the AM indicates TBV is available, it is considered to be a Verified Flat File Pointer. If Recovery In Process is set, write TBV back to the flat file.
1. If the AM indicates TBV is in-use, perform the following steps.
    2. If the RI of TBV indicates it is the last segment of a Message, then if Recovery In Process is set, write TBV back to the flat file and place TBV in the Retained Message Segment List (RSL) as discussed below with respect to Data Base Recovery. TBV is not a Verified Flat File Pointer. Otherwise, if Recovery In Process is reset, initiate recovery of the data base from the flat file and reprocess TBV. When TBV is reprocessed, the entire MS will be read and written.
    2. Otherwise, read the RI of the MS pointed to by the LA field of the RI of TBV. For the purpose of this discussion, this MS is referred to as LMS (Last Message Segment).
    2. Perform Recovery Information Verification on LMS. If an error is returned, TBV can not be used; place it in the EFFL.
    2. If the AM of LMS indicates it is in-use and the MN in the RI of TBV is the same as the MN in the RI of LMS, then if Recovery In Process is set, write TBV back to the flat file and place it in the Retained Message Segment List (RSL). TBV is not a Verified Flat File Pointer. Otherwise, if Recovery In Process is reset, initiate recovery of the data base from the flat file and reprocess TBV. When TBV is reprocessed, the entire MS will be read and rewritten.
    2. If the AM of LMS indicates it is in-use and the MN in the RI of TBV is not the same as the MN in the RI of LMS, TBV is considered to be a Verified Flat File Pointer. If Recovery In Process is set, place Available Recovery Information in TBV and write it to the flat file.
    2. If the AM of LMS indicates it is available, TBV is considered to be a Verified Flat File Pointer. If Recovery In Process is set, place Available Recovery Information in TBV and write it to the flat file.
1. If TBV is not a Verified Flat File Pointer, remove another Flat File Pointer from UFFL for verification.

The Verified Flat File List (VFFL) 42 (FIG. 1) contains a list of FFPs which are available and have been verified. The VFFL is constructed by a process that removes a FFP from the UFFL and performs the verification process as illustrated in FIGS. 8a–8c. If the FFP is a Verified Flat File Pointer, it is placed in the VFFL.

Figure 9:
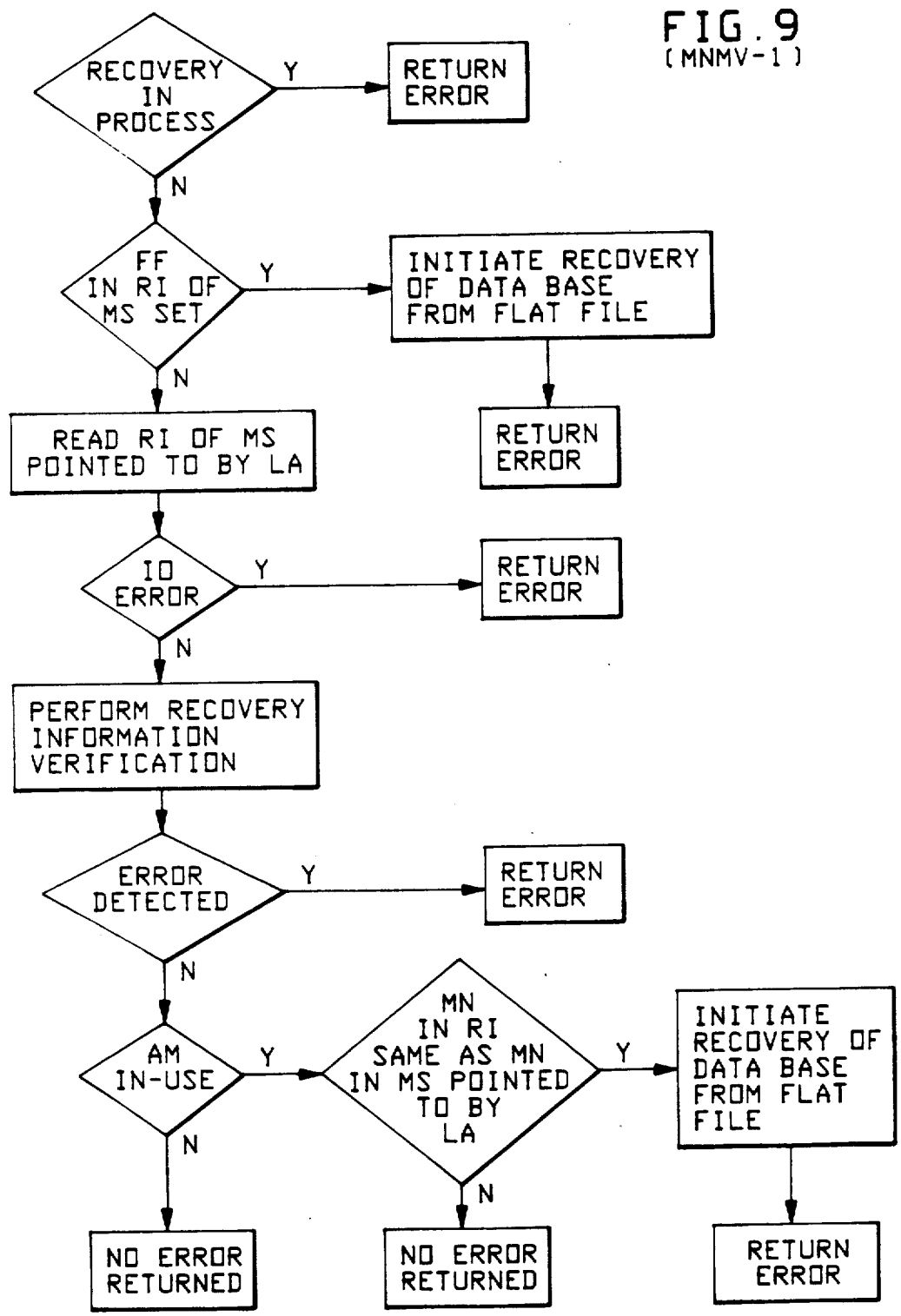
Figure 10A:
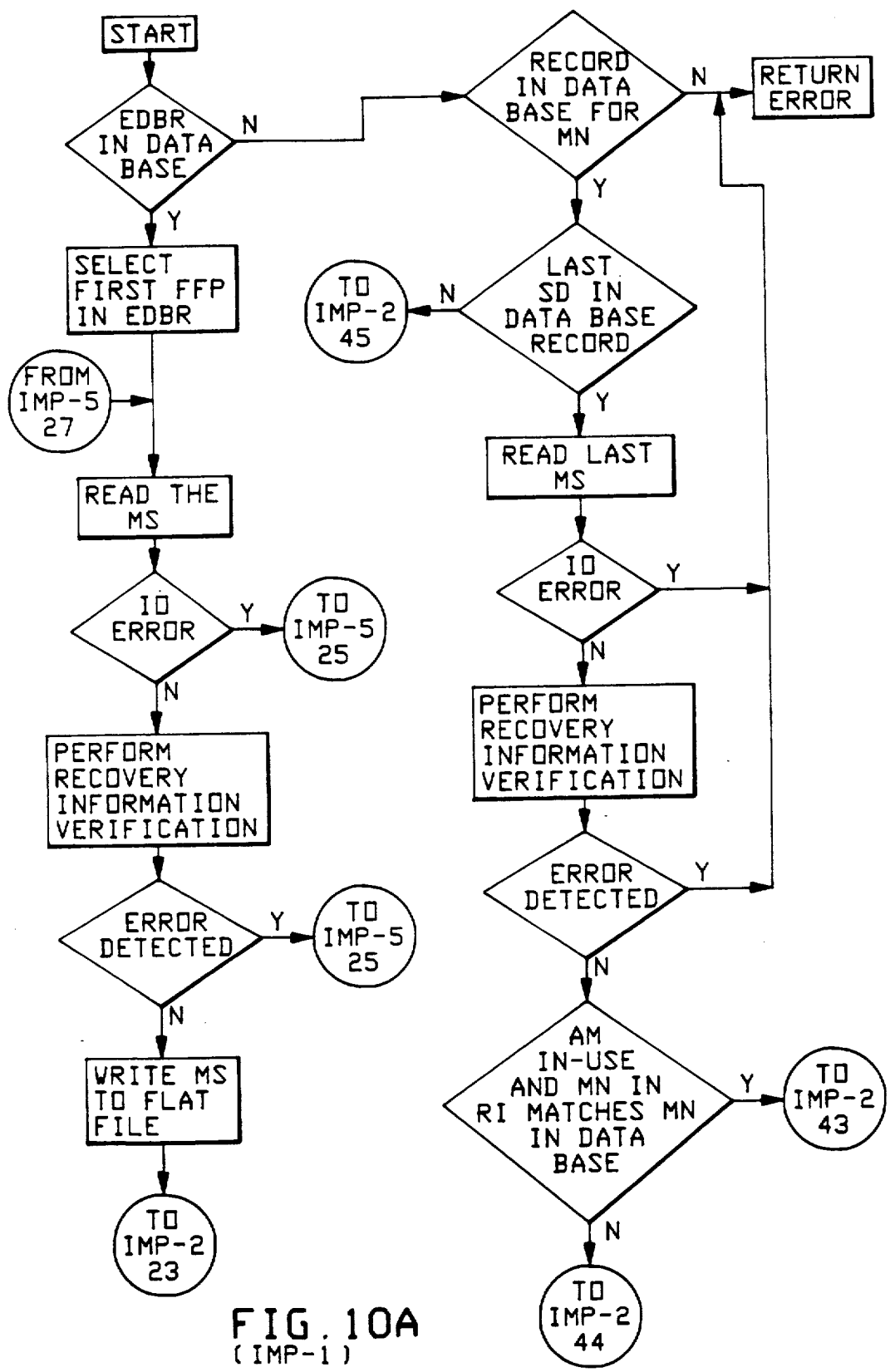
Figure 10E:
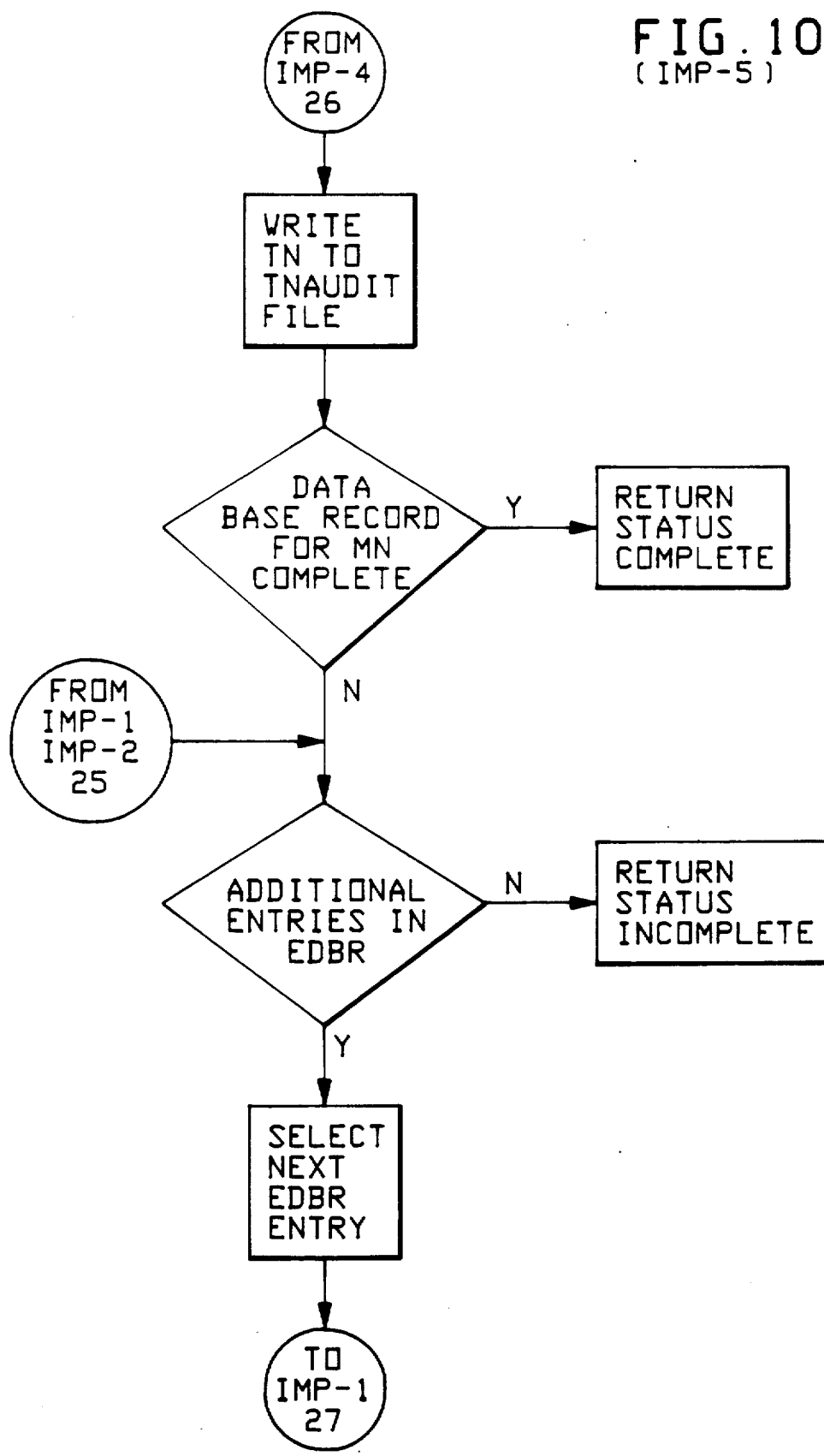
Figure 11B:
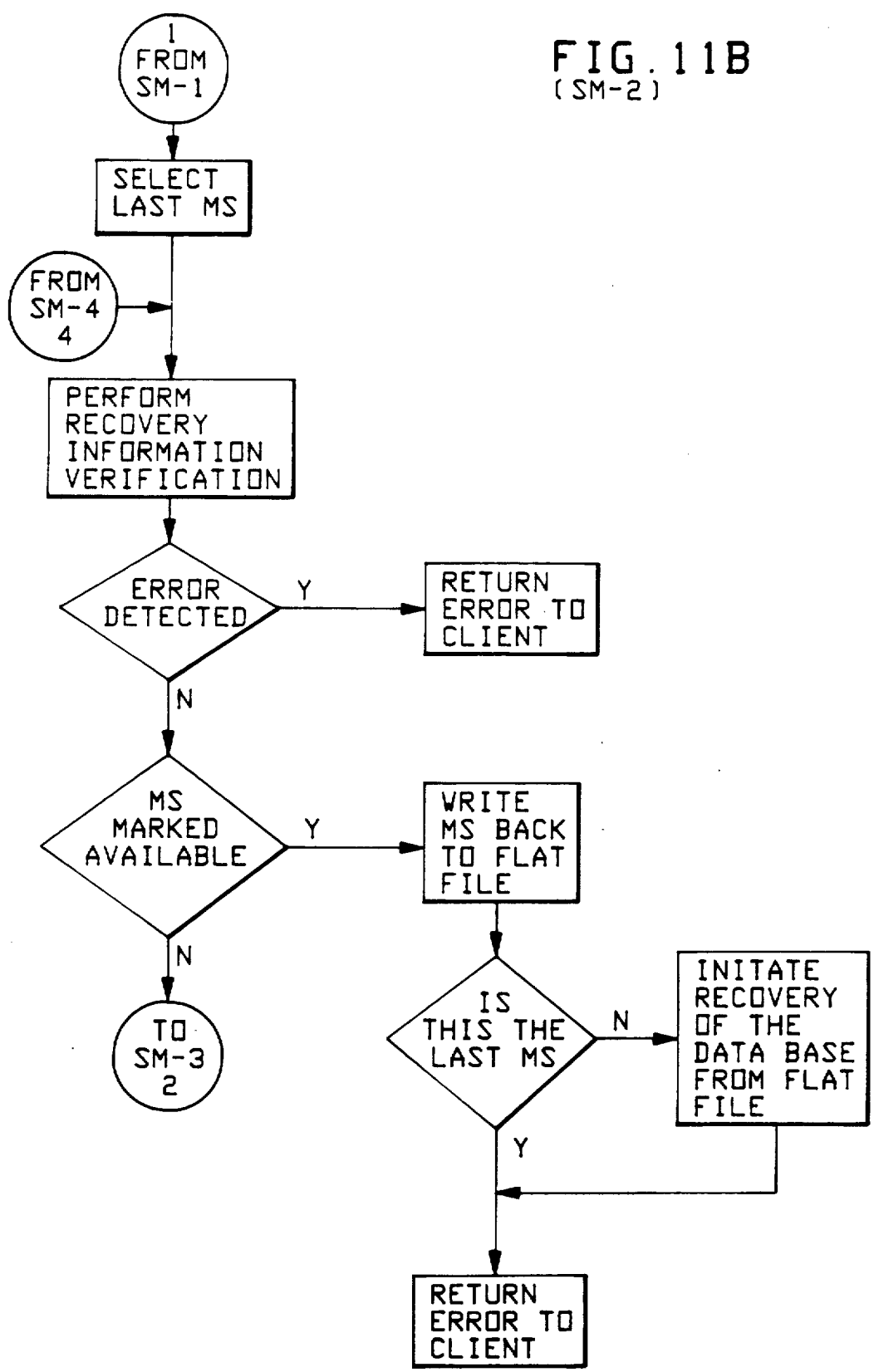

Referring to FIG. 9, a Message Number Mismatch Verification routine is illustrated. Message Number Mismatch Verification is performed when a mismatch occurs between the MN in the data base and the MN in the RI. The objective of this verification process is to determine whether recovery of the data base from the flat file must be initiated. For the purpose of this discussion, the MS which requires verification is referred to as TBV (To Be Verified).

1. If Recovery In Process is set, return an error.
1. If TBV is the last segment of a Message, initiate recovery of the data base from the flat file and return an error.
1. Read the RI of the MS pointed to by the LA field of the RI of TBV. For the purpose of this discussion, the MS is referred to as LMS (Last Message Segment).
1. If an I/O error is detected, return an error, but do not initiate recovery of the data base from the flat file.
1. Perform Recovery Information Verification on LMS. If an error is detected, return it, but do not initiate recovery of the data base from the flat file.
1. If the AM indicates LMS is in-use and the MN is the same as the MN of TBV, initiate recovery of the data base from the flat file and return an error.
1. Otherwise, do not initiate recovery.

Referring to FIGS. 10a–10e, flow charts for performing Incomplete Message Processing are illustrated. Incomplete Message Processing for a specific MN is performed when an attempt is made to use a Message which has the IMF field set or when a client-specified MN can not be found in the data base and Recovery In Process is reset.

Incomplete Message Processing also is performed periodically to process all FFPs in the Error Data Base Record (EDBR). An EDBR is placed in the data base if recovery of the data base from the flat file is performed and I/O errors are detected on one or more Message Segments. The EDBR contains FFPs to all Message Segments which were found to contain I/O errors at the time recovery of the data base from the flat file was performed.

Incomplete Message Processing will attempt to resolve the current state of a Message. For the purpose of this discussion, the MN required to be resolved is referred to as IMN (Incomplete Message Number). The following steps are performed.
1. If the EDBR is not in the data base, perform the following steps.
    2. If a data base record exists of IMN, perform the following steps.
        3. If the last SD in the data base record is present, perform the following steps.
            4. Read the RI for the MS pointed to by the last SD in the data base record.
            4. If an I/O error is detected, discontinue processing the data base record.
            4. Perform Recovery Information Verification for the MS pointed to by the last SD in the data base record. If an error is encountered, discontinue processing the data base record.
            4. If the AM of the MS pointed to by the last SD in the data base record indicates it is in-use and the MN in the RI does not match the MN in the data base record, perform Message Number Mismatch Verification on this MS. If the verification process invokes recovery of the data base from the flat file, write the MS back to the flat file and discontinue processing the data base record. If an error is detected during the verification process, discontinue processing the data base record.
            4. Overwrite the RI of the last MS with Available Recovery Information. If an I/O error is detected, discontinue processing the data base record.
        3. Obtain a TN.
        3. Begin Transaction.
        3. Place the TN in the Restart Data Set.
        3. Place all FFPs from this data base record in the UFFL and delete the data base record for IMN from the data base.
        3. End Transaction.
        3. Write the TN to the TNAUDIT file.
    2. Return an error.
1. Otherwise, for each MS pointed to by the EDBR, perform the following steps.
    2. Read the MS.
    2. If I/O errors are encountered, process the next MS.
    2. Perform Recovery Information Verification. If errors are encountered, process the next MS.
    2. Write MS back to the flat file.
    2. If I/O errors are encountered, process the next MS.
    2. If the MN in the RI matches IMN, perform the following steps.
        3. Obtain a TN.
        3. Begin Transaction.
        3. Place the TN in the Restart Data Set.
        3. Remove the FFP to the MS just processed from the EDBR. If this record is now empty, delete it from the data base
        3. Update the data base record at IMN to contain a SD to the MS just processed. If a data base record does not exist for IMN, create one with IMF set.
        3. If IMN is now complete, reset the IMF field.
        3. If IMN is not complete and there are no other entries in the EDBR, perform the following steps.
            4. If the last SD in the data base record is present, perform the following steps.
                5. Read the RI for the MS pointed to by the last SD in the data base record.
                5. If an I/O error is detected, discontinue processing the data base record.
                5. Perform Recovery Information Verification for the MS pointed to by the last SD in the data base record. If an error is encountered, discontinue processing the data base record.
                5. If the AM of the MS pointed to by the last SD in the data base record indicates it is in-use and the MN in the RI does not match the MN in the data base record, perform Message Number Mismatch Verification on this MS. If the verification process invokes recovery of the data base from the flat file, write the MS back to the flat file and discontinue processing the data base record. If an error is detected during the verification process, discontinue processing the data base record.
                5. Overwrite the RI of the last MS with Available Recovery Information. If an I/O error is detected, discontinue processing the data base record.
            4. Place all FFPs from this data base record in the UFFL and delete the data base record for IMN from the data base.
        3. End Transaction.
        3. Write the TN to the TNAUDIT file.
    2. If IMN is now complete, discontinue processing of the EDBR.
1. Return the status of the Message, indicating that the Message is (a) complete and able to be processed, (b) not in the data base, or (c) not currently available. "Not currently available" is returned for any Message which is not complete or does not exist in the data base as long as the EDBR is in the data base.

The Message Management Module routines 15 (FIG. 1) include a repertoire of commands that allow a client to request services from the apparatus. A client may request that a Message be sent, received or deleted. In addition, a client may request that an external file be created or loaded from the flat file. In order to allow an application to participate in orphan message deletion, a command is provided to generate a list of Message Numbers known to the apparatus. A command is provided to enable additional available records to be added to the flat file.

Before a MS is used or marked available its identity is confirmed. In addition, verification is performed to ensure that the data base is consistent with the flat file. Two kinds of inconsistency are possible between the data base and flat file. A "normal" inconsistency exists when a Message exists in the data base and all its Message Segments in the flat file except the last are valid and consistent with the data base. A normal inconsistency also exists when a MS is not referenced by any Message in the data base and is marked in-use and its last segment (to which it points) is either marked available or in-use by a different Message. These cases arise when a Receive Message or Delete Message command is interrupted by a failure. Any other type of inconsistency is "abnormal". Whenever an abnormal inconsistency is discovered or it is otherwise suspected that the data base is obsolete, the data base is automatically reconstructed from the flat file.

The command repertoire comprises: Send Message, Receive Message, Delete Message, Get Message, Create Message, Enlarge Flat File, and Get Message Numbers.

Referring to FIGS. 11a–11d, details of the Send Message command are illustrated. This command instructs the apparatus to locate a Message in the flat file and deliver it to a data channel.

1. Use the data base to find the SDs for the specified MN.
1. If the MN is not in the data base or the MN is in the data base and the IMF field is set, perform the following steps.
   2. If Recovery In Process is set, return an error to the client.
   2. Otherwise, perform Incomplete Message Processing which returns the status of the Message. If the Message is now present and complete, continue processing; otherwise, return an error to the client.
1. Read each MS.
1. For each MS starting with the MS pointed to by the last SD in the data base record, perform the following steps.
   2. Perform Recovery Information Verification. If an error is encountered, return it to the client.
   2. If the AM of a MS indicates it is available, perform the following steps.
      3. Write the MS back to the flat file.
      3. If this is not the MS pointed to by the last SD in the data base record, initiate recovery of the data base from the flat file.
      3. Return an error to the client.
   2. If the AM of a MS indicates it is in-use and the MN in the RI does not match the MN in the data base record, perform the following steps.
      3. Write the MS back to the flat file.
      3. If this is the MS pointed to by the last SD in the data base record, perform Message Number Mismatch Verification on this MS which may invoke recovery of the data base from the flat file.
      3. If this is not the MS pointed to by the last SD in the data base record, initiate recovery of the data base from the flat file.
      3. Return an error to the client.
1. If the WBL 45 (FIG. 1) entry for the last MS is not set, write the last MS to the flat file and set the WBL entry for the last MS. In this manner the last MS is written back to the flat file if it had not been written back since the last initialization of the apparatus.
1. Send data over the data channel.

Figure 12A:
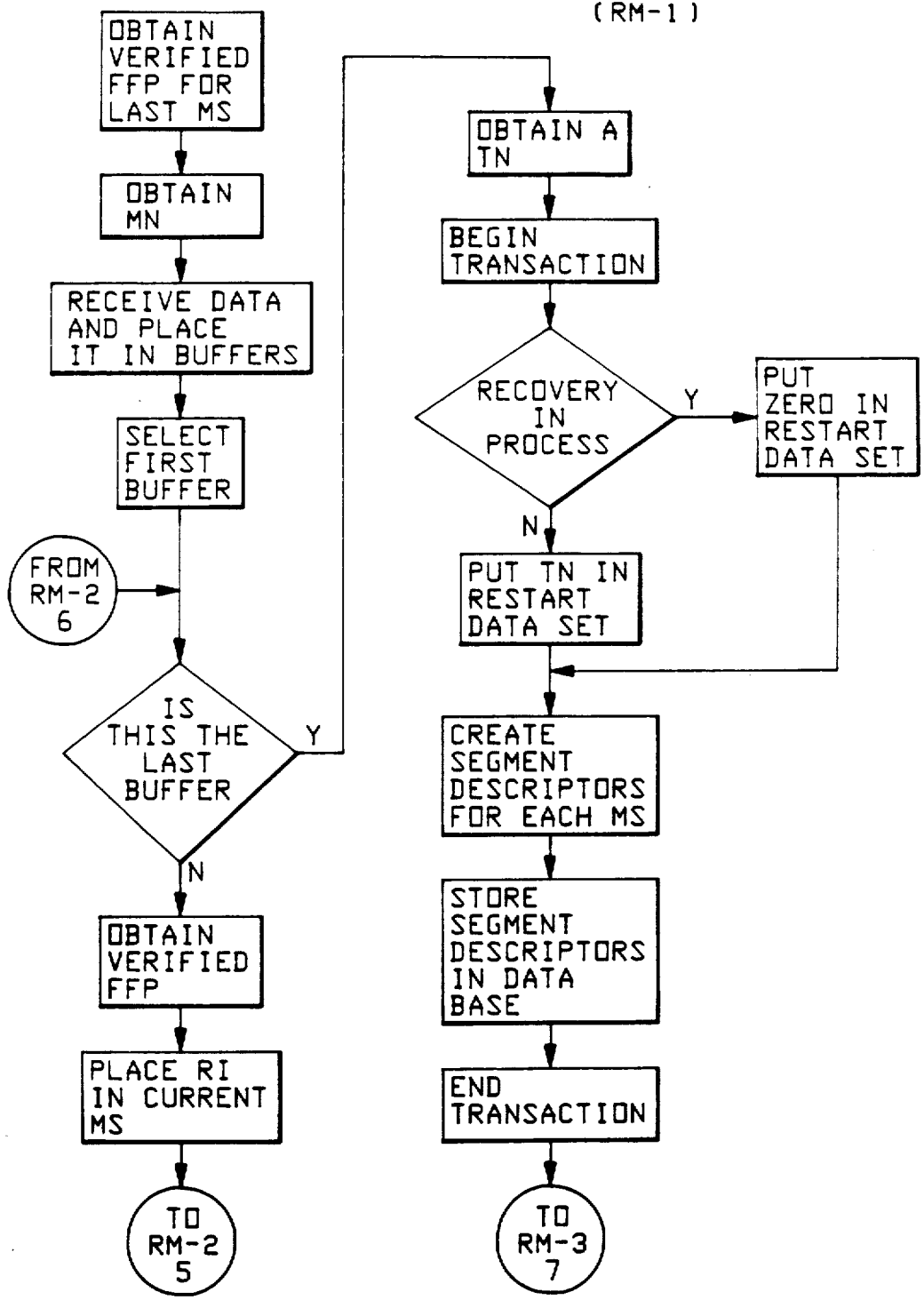
Figure 12B:
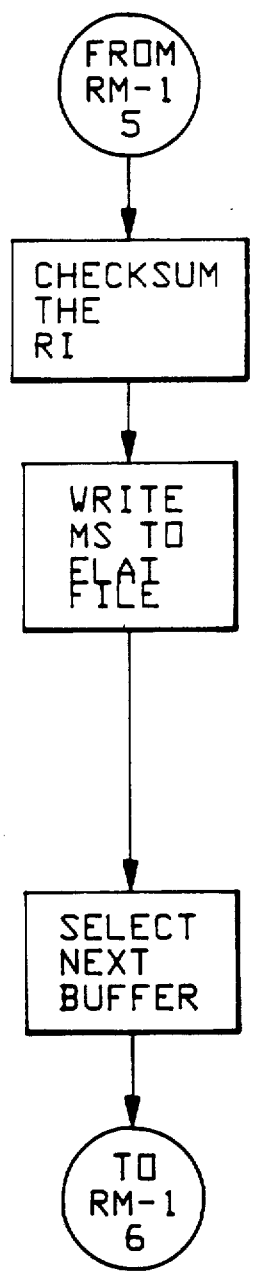
Figure 12C:
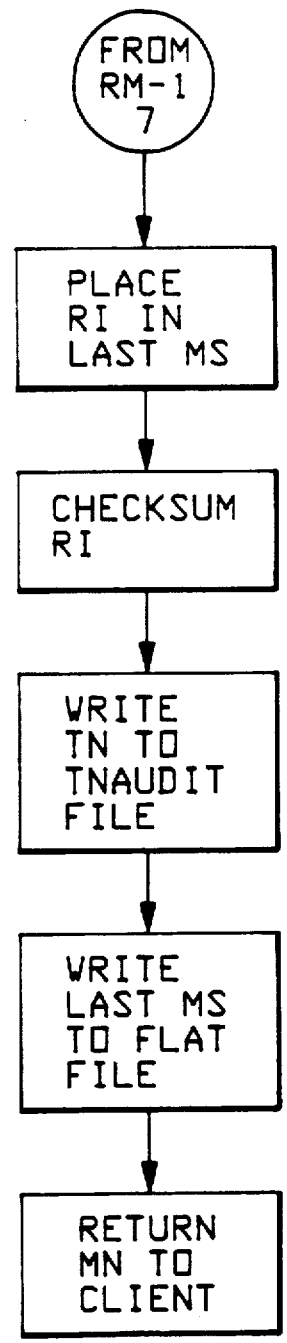
Figure 13A:
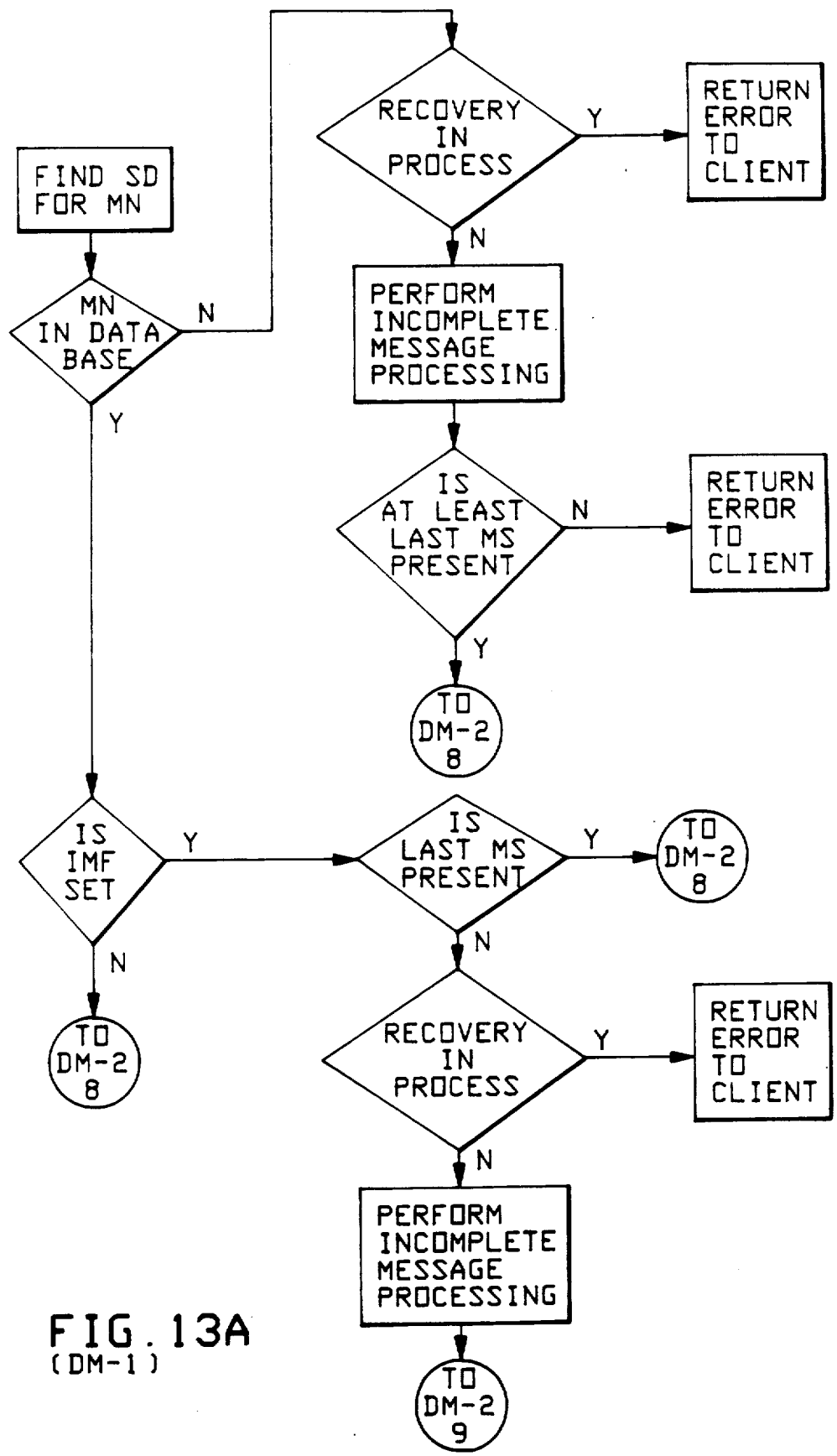
Figure 13B:
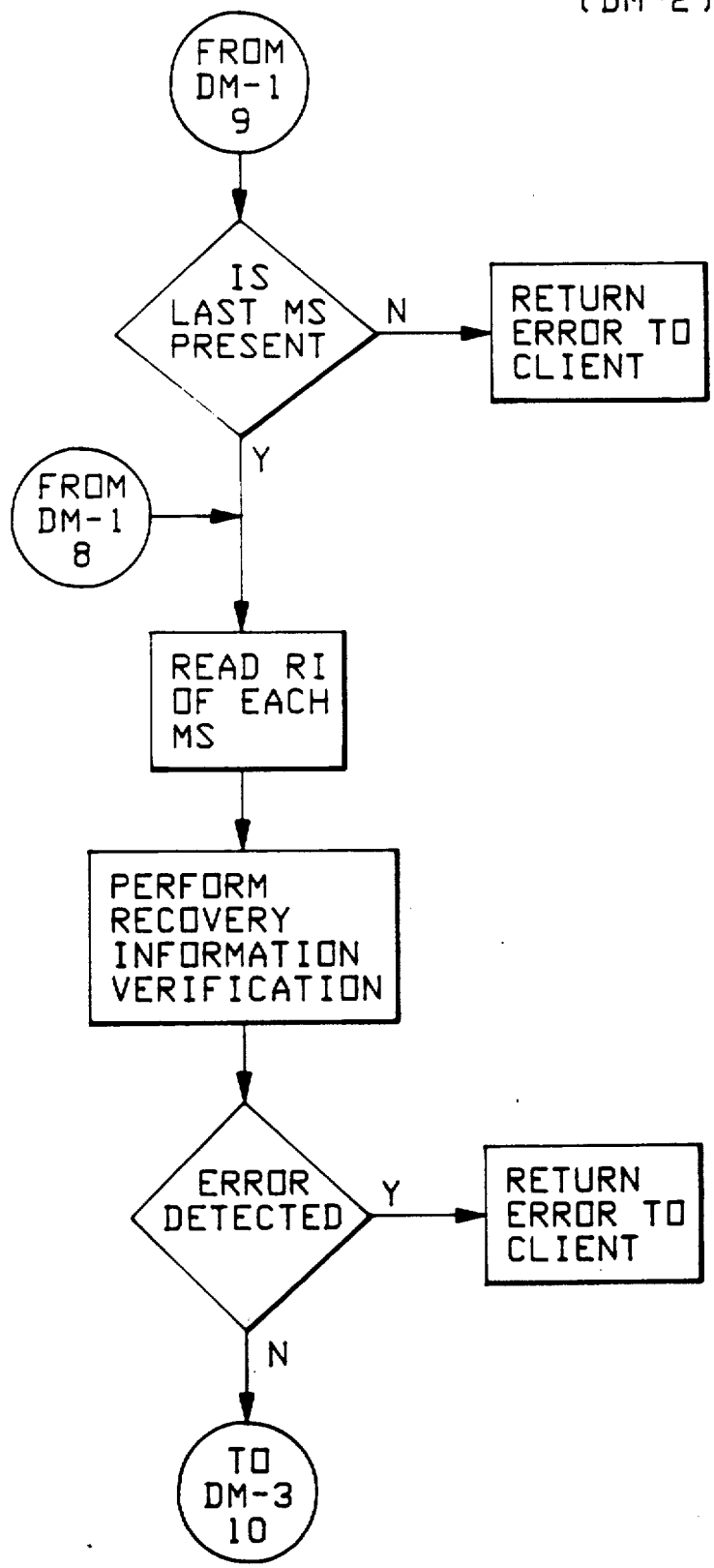
Figure 13C:
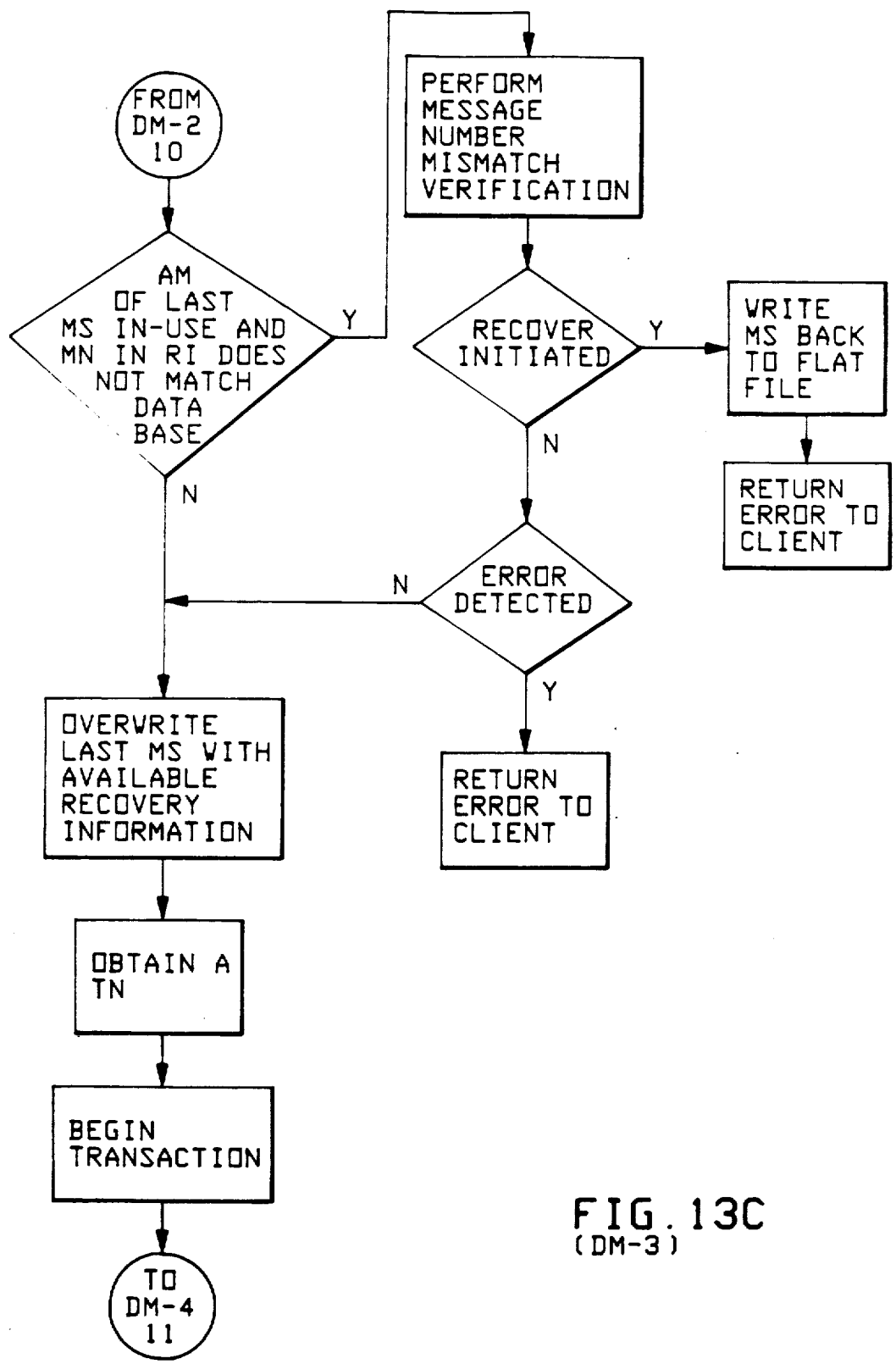
Figure 13F:
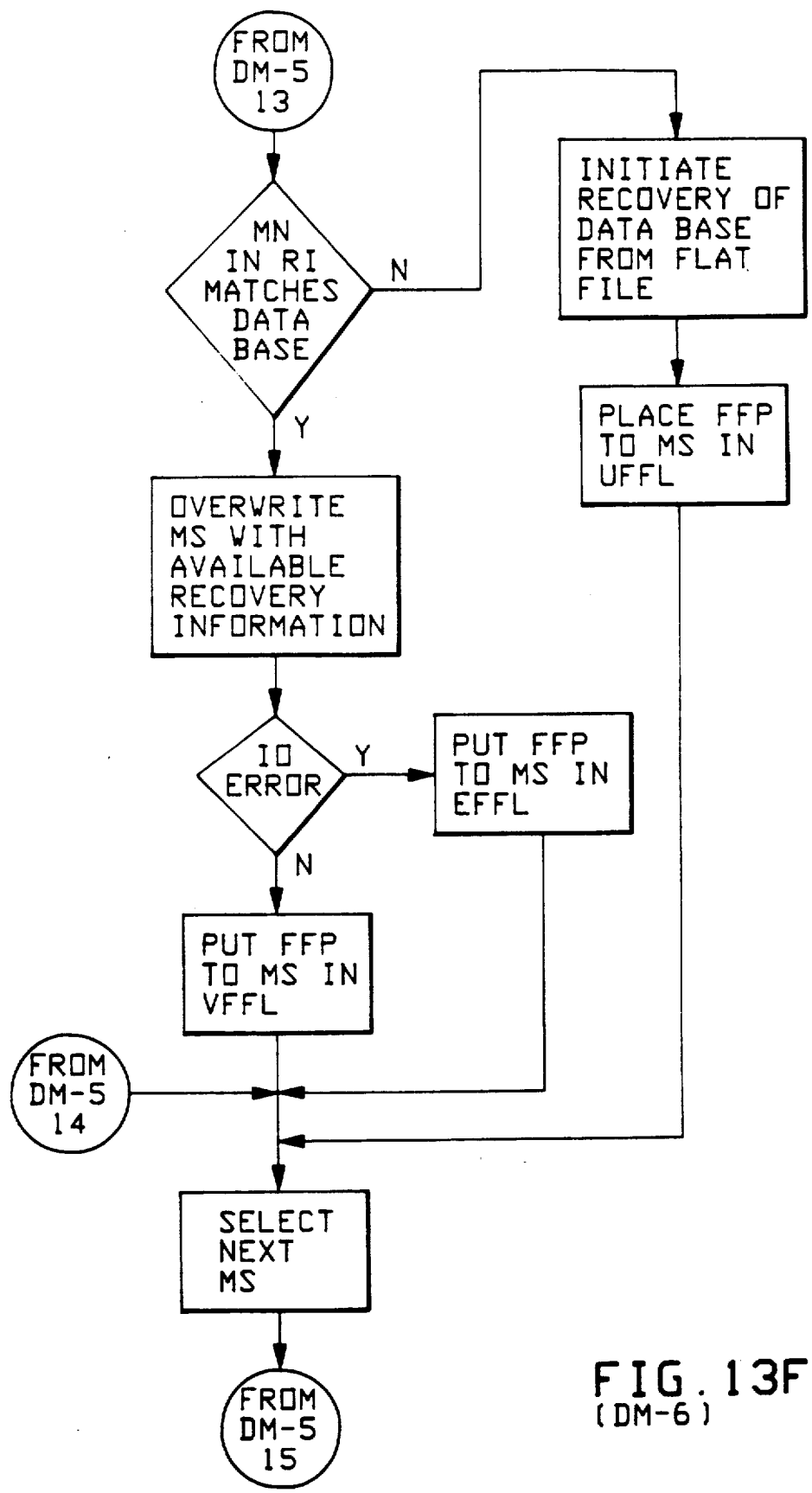

Referring to FIGS. 12a–12c, details of the Receive Message command are illustrated. This command instructs the apparatus to receive data from a data channel and store the data in the flat file.

1. Obtain a Verified Flat File Pointer for the last MS.
1. Obtain a MN which is used to identify this Message.
1. Obtain the data and place it into buffers. Each buffer holds one MS.
1. For each MS, except the last, perform the following steps.
   2. Obtain a Verified Flat File Pointer.
   2. Place RI in the current MS.
   2. Checksum the RI.
   2. Write the MS to the flat file.
1. Obtain a TN.
1. Begin Transaction.
1. If Recovery In Process is set, place a zero in the Restart Data Set. Otherwise, place the TN in the Restart Data Set.
1. Create Segment Descriptors for each MS and store them in the data base using the MN as a key.
1. End Transaction.
1. Place RI in the last MS.
1. Checksum the RI.
1. Write the TN to the TNAUDIT file.
1. Write the last MS to the flat file.
1. Return the MN to the client.

Referring to FIGS. 13a–13f, details of the Delete Message command are illustrated. This command instructs the apparatus to delete a Message from the data base and return all storage associated with the Message for reallocation.

1. Use the data base to find the Segment Descriptors for the MN.
1. If the MN is not in the data base, perform the following steps.
   2. If Recovery In Process is set, return an error to the client.
   2. Otherwise, perform Incomplete Message Processing which returns the status of the Message. If the Message is now present or at least the MS pointed to by the last SD in the data base record is present, continue processing; otherwise, return an error to the client.
1. Otherwise, if the MN is in the data base and the IMF field is set, perform the following steps.
   2. If the MS pointed to by the last SD in the data base record is present, continue processing.
   2. Otherwise, if Recovery In Process is set, return an error to the client.
   2. Otherwise, perform Incomplete Message Processing which returns the status of the Message. If the MS pointed to by the last SD in the data base record is present, continue processing; otherwise, return an error to the client.
1. Read the RI for each MS.
1. Perform Recovery Information Verification for each MS. If an error is encountered, return it to the client.
1. If the AM of the MS pointed to by the last SD in the data base record indicates it is in-use and the MN in the RI does not match the MN in the data base record, perform Message Number Mismatch Verification on this MS. If the verification process invokes recovery of the data base from the flat file, write the MS back to the flat file and return an error to the client. If any other error is encountered in the verification process, return it to the client.
1. Overwrite the RI of the last MS with Available Recovery Information.
1. Obtain a TN.
1. Begin Transaction.
1. If Recovery In Process is set, place a zero in the Restart Data Set. Otherwise, place the TN in the Restart Data Set.
1. Delete the records from the data base.
1. End Transaction.
1. Write the TN to the TNAUDIT file.
1. Place the FFP to the last MS in the VFFL.

1. For all other Message Segments, perform the following steps. Process all Message Segments even if recovery of the data base from the flat file is invoked.
    2. If the AM of a MS indicates it is available, initiate recovery of the data base from the flat file and write the RI back to the flat file. If an I/O error is detected, place the FFP to the MS in the EFFL, otherwise, place the FFP to the MS in the VFFL.
    2. If the AM of a MS indicates it is in-use and the MN in the RI does not match the MN in the data base record, initiate recovery of the data base from the flat file and place the FFP to the MS in the UFFL.
    2. If the AM of a MS indicates it is in-use and the MN in the RI matches the MN in the data base record, overwrite the RI with Available Recovery Information. If an I/O error is detected, place the FFP to the MS in the EFFL; otherwise, place the FFP to the MS in the VFFL.

With respect to the Get Message command, if there is a need to extract a Message from the flat file and place it in an external file, the same techniques used when sending a Message are used for Get Message. However, instead of sending the data over a data channel, the Message is written to an external file.

With respect to the Create Message command, if there is a need to obtain a Message from an external file and place it in the flat file, the same techniques used when receiving a Message are used for Create Message. However, instead of receiving the data from a data channel, the data is obtained from an external file.

Referring to FIG. 14, details of the Enlarge Flat File command are illustrated. The flat file can be enlarged while data is being sent or received. If the enlarge process is interrupted by a system failure, it is restarted automatically.
1. Record the fact that an enlarge is in process in a reserved location of the flat file.
1. Add an area of disk to the flat file.
1. Write Available Recovery Information to each new MS.
1. Record the new size of the flat file in a reserved location in the flat file.
1. Add the FFPs to the new Message Segments to the VFFL.

Referring to FIG. 15, details of the Get Message Numbers command are illustrated. This command returns a list of MNs associated with a specific application and allows application data bases to be synchronized with the data base in the apparatus. All MNs that existed prior to the last initialization of the apparatus and are associated with a specified DBN are provided to the client. Any MN known to the apparatus, but not known to the application, is referred to as an orphan Message.

After the MNs are returned to the application, it is the responsibility of the application to command the apparatus to delete those MNs which are not in the application data base and to delete from the application data base those MNs which are not indicated by Get Message Numbers.
1. If Recovery In Process is set, return an error to the client.
1. Return a MN Limit from stored Token (FIG. 4) which indicates the largest MN an application should process. Any MNs larger than the MN Limit, have been created after the apparatus was initialized and will not be returned to the client. The application must only attempt to reconcile those Messages which have a MN less than the MN Limit.
1. Return a list of MNs such that the DBN field in the data base record matches the DBN assigned to the application and such that each MN existed prior to the last initialization of the apparatus.

Referring to FIG. 16, details of the apparatus Initialization sequence, as outlined in the following paragraphs, are illustrated. This sequence is performed by the apparatus following each system failure and before any client commands are accepted.
1. Obtain the largest TN from the Restart Data Set of the data base.
1. Obtain the largest TN from the TNAUDIT file (all records in the file are read and written). If this file is missing or can not be read, the TN in the TNAUDIT file is assumed to be larger than TN in the data base. If the file is missing, it is recreated.
1. If the TN from the TNAUDIT file is greater than the TN from the Restart Data Set, initiate recovery of the data base from the flat file.
1. Increment the largest TN (of the two from the TNAUDIT file and Restart Data Set) and use this for the new value of TN.
1. Determine the next MN to be assigned. Information saved in a reserved portion of the flat file allows the next MN to be assigned.
1. If the flat file was in the process of being enlarged, restart the enlarge process. The fact that an Enlarge is in process is saved in a reserved portion of the flat file.
1. Assume all Message Segments of the flat file are available.
1. Complement the data base, thus building the UFFL.
1. Reset all entries in the WBL.
1. Initiate a process to verify the UFFL.

Referring to FIGS. 17a-17e, details of the operation of Data Base Recovery are illustrated. Recovery of the data base from the flat file is initiated when a mismatch between the flat file and data base is detected or the TNAUDIT file indicates the data base did not recover or has been rolled back.
1. Set Recovery In Process.
1. Move all entries in the VFFL to UFFL.
1. If an EDBR is in the data base, remove all FFPs from this record and place in the UFFL. Delete the EDBR from the data base.
1. If the EFFL is not empty, move all FFPs to the UFFL.
1. For each Message in the data base, perform the following.
    2. If the IMF field is set, delete this Message from the data base and place all FFPs in the UFFL.
    2. Otherwise, for each MS (starting with the MS pointed to by the last SD in the data base record), perform the following.
        3. Read the MS.
        3. If an I/O error is detected, this MS can not be processed. If this is the MS pointed to by the last SD in the data base record, delete this Message from the data base and place all FFPs in the UFFL (no other processing of this data base record is performed). If this is not the MS pointed to by the last SD in the data base record, processing of this data base record will continue. However, no additional processing of this MS is performed.
3. Perform Recovery Information Verification. If an error is detected, this MS can not be processed. If this is the MS pointed to by the last SD in the data base record, delete this Message from the data base and place all FFPs in the UFFL (no other processing of this data base record is performed). If this is not the MS pointed to by the last SD in the data base record, processing of this data base record will continue; however, no additional processing of this MS is performed.
3. Write the MS back to the flat file.
3. If an I/O error is detected, this MS can not be processed. If this is the MS pointed to by the last SD in the data base record, delete this Message from the data base and place all FFPs in the UFFL (no other processing of this data base record is performed). If this is not the MS pointed to by the last SD in the data base record, processing of this data base record will continue. However, no additional processing of this MS is performed.
3. If the AM indicates the MS is available or the AM indicates the MS is in-use and the MN in the RI does not match the MN in the data base, delete this Message from the data base and place all FFPs in the UFFL (no other processing of this data base record is performed).
1. For each FFP in the UFFL, perform the following.
2. Perform the steps of FIGS. 8a-8c, Verified Flat File Pointer. If a MS fails verification, because it is part of a valid message, it is placed in the Retained Segment List (RSL). If the FFP is a Verified Flat File Pointer, place it in the VFFL.
1. Sort the RSL by MN and SSN.
1. All complete Messages will result in data base records being built.
1. If the EFFL is empty, Available Recovery Information is written in each MS of all incomplete Messages. If an I/O error is detected, the FFP to the MS is placed in the EFFL, otherwise, the FFP to the MS is placed in the VFFL.
1. Otherwise, if the EFFL is not empty, data base records are built for incomplete Messages. Each of these records is built with the IMF field set. In addition, an EDBR is built for the Message Segments which could not be read.
1. Reset Recovery In Process.
1. Obtain a TN.
1. Begin Transaction.
1. Place the TN in the restart data set.
1. End Transaction.
1. Write the TN to the TNAUDIT file. If an I/O error is detected, it is ignored.

It is appreciated from the foregoing, that recovery of the data base from the flat file is initiated when a mismatch between the flat file and data base is detected or TNAUDIT indicates that the data base did not recover after initialization or has been rolled back. Specifically, recovery of the data base is initiated when an MS mismatch between the flat file and data base is detected and Message Number Mismatch Verification (FIG. 9) indicates that recovery should be initiated. Specifically, recovery is not initiated when a Message exists in the data base and all its Message Segments in the flat file, except the last, are valid and consistent with the data base. Additionally, data base recovery is not invoked when a Message Segment is not referenced by any Message in the data base and is marked in-use and its last Message Segment (to which it points) is either marked available or in-use by a different Message. Generally, these situations arise when a Receive Message or Delete Message command is interrupted by a failure. For all other MS inconsistencies, data base recovery is invoked.

It is appreciated, that the system of the present invention manages large volumes of volatile real-time data received as separate variable-length Messages, where each Message is comprised of fixed-length Message Segments.

It is appreciated, that in the above descriptions and in the Claims, references to a "last Message Segment" may indicate a Message Segment with the Final Flag set or the last Message Segment addressed by a data base record. The language "last Message Segment" is utilized to indicate the former and the language "Message Segment pointed to by the last Segment Descriptor (SD or Pointer) in the data base record" is utilized to indicate the latter. It is appreciated, that the Message Segment pointed to by the last SD in a data base record normally would be marked in-use and would have the Final Flag set. This Message Segment could, however, have an unset Final Flag and can have an AM of available.

As described above and as recited in the Claims, it is appreciated that the data base recovery may be initiated by the comparison of the Message Number in the Recovery Information from two Message Segments. In order to differentiate the two different sets of Recovery Information, the language "Recovery Information of the Message Segment pointed to by the last Segment Descriptor in the data base" and "Recovery Information of the Message Segment addressed by the Last Address of the Recovery Information of the Message Segment pointed to by the last Segment Descriptor in the data base" is used.

Recovery of the data base from the flat file is initiated if one of the following cases is detected.

Case 1

The Message Segment is marked in-use AND The Message Number in the Recovery Information of the Message Segment is not the same as the Message Number in the data base AND The Message Segment is not pointed to by the last Segment Descriptor in the data base record (the Final Flag is not used to make this determination).

Case 2

The Message Segment is marked available AND The Message Segment is not pointed to by the last Segment Descriptor in the data base record (the Final Flag is not used to make this determination).

Case 3

The Message Segment is marked in-use AND The Message Number in the Recovery Information of the Message Segment is not the same as the Message Number in the data base AND The Message Segment is pointed to by the last Segment Descriptor in the data base record (the Final Flag is not used to make this determination) AND The Available Marker in the Recovery Information of the Message Segment addressed by the Last Address of the Recovery Information of the Message Segment pointed to by the last Segment Descriptor in the data base is marked in-use AND The Message Number in the Recovery Information of the Message Segment pointed to by the last Segment Descriptor in the data base is the same as the Message Number in the Recovery Information of the Message Segment addressed by the Last Address of the Recovery Information of the Message Segment pointed to by the last Segment Descriptor in the data base.

It is appreciated from the foregoing, that with respect to the Send Message and Delete Message commands, the Recovery Information of each Message Segment to be sent or deleted is verified. Recovery of the data base from the flat file will be initiated if one of the following cases is detected.

Case 1

The Message Segment is marked available AND The Message Segment is not pointed to by the last Segment Descriptor in the data base record.

Case 2

The Message Segment is marked in-use AND The Message Number in the Recovery Information of the Message Segment is not the same as the Message Number in the data base AND The Message Segment is not pointed to by the last Segment Descriptor in the data base record.

Case 3

The Message Segment is marked in-use AND The Message Number in the Recovery Information of the Message Segment is not the same as the Message Number in the data base AND The Message Segment is pointed to by the last Segment Descriptor in the data base record AND The Available Marker in the Recovery Information of the Message Segment addressed by the Last Address of the Recovery Information of the Message Segment pointed to by the last Segment Descriptor in the data base is marked in-use AND The Message Number in the Recovery Information of the Message Segment pointed to by the last Segment Descriptor in the data base is the same as the Message Number in the Recovery Information of the Message Segment addressed by the Last Address of the Recovery Information of the Message Segment pointed to by the last Segment Descriptor in the data base.

It is appreciated, that Incomplete Message Processing comprises processing an Error Data Base Record (EDBR) which consists of Message Segments which could not be read and written during recovery of the data base from the flat file. An attempt is made to read, verify the Recovery Information of and write each Message Segment addressed by the Error Data Base Record. If a Message Segment is read, verified and written and the Message Number in the Recovery Information is the same as the Message Number of an Incomplete Message, the address is removed from the Error Data Base Record and added to the Incomplete Message. If the appropriate (missing) Message Segments are added to the Incomplete Message, it will become complete, and therefore, usable. If the appropriate Message Segments are not found, the Incomplete Message will remain incomplete.

In short, Incomplete Message Processing = Process EDBR. Process EDBR = read, verify RI, and rewrite each MS in EDBR; if MS.RI.MN corresponds to incomplete record in DB remove address from EDBR and add corresponding SD to record in DB; if added SD makes record in DB complete, mark complete.

It is appreciated, that the above described system may, for example, be used in a telephone voice messaging system of the type described in co-pending U.S. Patent application 07/521,210, filed May 7, 1990, entitled "Digital Computer Platform For Supporting Telephone Network Applications", by D. W. Heileman, Jr., F. C. Kruesi, R. H. Latimer and T. L. Bennett. Said Ser. No. 521,210 is assigned to the assignee of the present invention.

It is further appreciated, that data may be transported between the data channels 11 and the I/O processor 12 across an interface (not shown) of the type described in co-pending U.S. Patent application Ser. No. 07/503,195, filed Apr. 2, 1990, entitled "Apparatus For Interfacing A Real-Time Communication Link To An Asynchronous Digital Computer System", by R. H. Latimer and D. W. Heileman, Jr. Said Ser. No. 503,195 is assigned to the assignee of the present application While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A Message Management System for managing large volumes of volatile real-time data received as separate Messages, each said Message being identified by a Message Number and comprised of Message Segments including a last Message Segment, said system comprising flat file means for storing said Message Segments at respective addresses of said flat file means, data base means having an indexing structure for accessing said Messages by pointers to said addresses in said flat file means, said indexing structure containing data base records keyed to said Message Number, each keyed indexing structure record containing pointers to said addresses in said flat file means whereat Message Segments comprising said Message keyed by said Message Number reside, respectively, said pointers including a last pointer in said record corresponding to said last Message Segment, each said Message Segment stored in said flat file means having Recovery Information stored therewith for rebuilding said data base means from said Recovery Information in the event an indicium indicates that said data base means is inconsistent with said Recovery Information, said Recovery Information stored with each Message Segment containing a Last Address field for storing the flat file address of the last Message Segment of the Message containing said Message Segment, and recovery means responsive to said Recovery Information and said indicium for rebuilding said data base means from said Recovery Information when said indicium indicates that said data base means is inconsistent with said Recovery Information.

2. The system of claim 1 further including a mirrored disk system and wherein said flat file means comprises a duplicate flat file residing on said mirrored disk system.

3. The system of claim 1 wherein said Recovery Information stored with a Message Segment includes a field for storing said Message Number of the message to which said Message Segment belongs.

4. The system of claim 3 wherein said Recovery Information stored with a Message Segment contains an Availability Marker field for storing an Availability Marker to indicate if said Message Segment is available for storing Message data.

5. The system of claim 4 wherein said Recovery Information stored with a Message Segment contains a Final Flag field for containing a Final Flag when a Message Segment is the last Message Segment of a Message.

6. The system of claim 5 wherein said Recovery Information stored with a Message Segment contains a Self Pointer field for storing the flat file address at which said Message Segment resides.

7. The system of claim 6 wherein said Recovery Information stored with a Message Segment contains a field for storing a Segment Sequence Number representative of Message Segment sequence position in a Message.

8. The system of claim 7 wherein said Recovery Information stored with a Message Segment contains a Checksum field for storing the Checksum of all other said fields comprising said Recovery Information.

9. The system of claim 8 further including
means for storing an incremented Transaction Number in said data base means, said Transaction Number being incremented in accordance with current transactions effected with respect to said data base means and said flat file means,
a TNAUDIT file for recording selected ones of said Transaction Numbers associated with said transactions, and
comparison means for comparing said Transaction Numbers in said TNAUDIT file and said data base means and for generating said indicium when any said Transaction Number in said TNAUDIT file is larger than said Transaction Number stored in said data base means.

10. The system of claim 9 further including Command Means responsive to a Send Message command, a Receive Message command and a Delete Message command for accessing a designated Message in said flat file means and sending said accessed Message over a data channel, receiving a Message from a data channel and storing said received Message in said flat file means and deleting a designated Message from said flat file means, respectively.

11. The system of claim 10 wherein said command means includes Send Message command means comprising
means for verifying said Recovery Information in each said Message Segment of said Message to be sent,
means responsive to said Availability Marker of each said Message Segment of said Message to be sent to determine if said Message Segment is in-use or available,
means coupled to said Availability Marker determining means for generating said indicium if said Message Segment is marked available and is not said Message Segment of said Message pointed to by said last pointer in said data base record, and
means for comparing said Message Number in said Recovery Information in each said Message Segment of said Message to be sent with said Message Number in said data base means for detecting a mismatch therebetween,
means coupled to said Availability Marker determining means and to said Message Number comparison means for generating said indicium if a Message Number mismatch is detected and said Message Segment is marked in-use and is not said Message Segment pointed to by said last pointer in said data base record, and
means coupled to said Availability Marker determining means and to said Message Number comparison means for generating said indicium if a Message Number mismatch is detected and said Message Segment is marked in-use and said Message Segment is pointed to by said last pointer in said data base record and the Recovery Information of the Message Segment addressed by the Last Address of the Recovery Information of the Message Segment pointed to by said last pointer in said data base record is marked in-use and the Message Number in the Recovery Information of the Message Segment pointed to by said last pointer in said data base record is the same as the Message Number in the Recovery Information of the Message Segment addressed by the Last Address of the Recovery Information of the Message Segment pointed to by said last pointer in said data base record.

12. The system of claim 10 wherein said command means includes Receive Message command means comprising
means for creating said Recovery Information in each Message Segment of said Message received.
means coupled to said creating means for writing each Message Segment to said flat file means except the last Message Segment of said Message,
means coupled to said writing means for generating said Transaction Number,
means coupled to said generating means for storing said data base means,
means coupled to said generating means for storing said Transaction Number, and
means coupled to said writing means for storing said last Message Segment.

13. The system of claim 10 wherein said command means includes Delete Message command means comprising
means for verifying said Recovery Information in each said Message Segment of said Message to be deleted,
means responsive to said Availability Marker of each said Message Segment of said Message to be deleted to determine if said Message Segment is in-use or available,
means coupled to said Availability Marker determining means for generating said indicium if said Message Segment is marked available and is not said Message Segment of said Message pointed to by said last pointer in said data base record,
means for comparing said Message Number in said Recovery Information in each said Message Segment of said Message to be deleted with said Message Number in said data base means for detecting a mismatch therebetween,
means coupled to said Availability Marker determining means and to said Message Number comparison means for generating said indicium if a Message Number mismatch is detected and said Message Segment is marked in-use and is not said Message Segment pointed to by said last pointer in said data base record, and means coupled to said Availability Marker determining means and to said Message Number comparison means for generating said indicium if a Message Number mismatch is detected and said Message Segment is marked in-use and said Message Segment is pointed to by said last pointer in said data base record and the Recovery Information of the Message Segment addressed by the Last Address of the Recovery Information of the Message Segment pointed to by said last pointer in said data base record is marked in-use and the Message Number in the Recovery Information of the Message Segment pointed to by said last pointer in said data base record is the same as the Message Number in the Recovery Information of the Message Segment addressed by the Last Address of the Recovery Information of the Message Segment pointed to by said last pointer in said data base record.

14. The system of claim 10 wherein said data base record includes a field for storing a Data Base Number identifying a client application and said command means includes means responsive to a Get Message Numbers command for getting all of the Message Numbers in said data base records created prior to the most recent initialization of said system and having a requested Data Base Number in said Data Base Number field.

15. The system of claim 8 further including Recovery Information Verification means responsive to said Recovery Information stored with a Message Segment for comparing said Self Pointer of said Recovery Information with said flat file address at which said Message Segment is stored and generating an error signal in accordance with a mismatch therebetween.

16. The system of claim 15 wherein said Recovery Information Verification means further includes Checksum means responsive to said Recovery Information for obtaining the Checksum of all but said Checksum field thereof, and comparison means for comparing said Checksum generated by said Checksum means to said Checksum stored in said Checksum field of said Recovery Information and generating an error signal in accordance with a mismatch therebetween.

17. The system of claim 8 wherein said data base record includes a field for storing an Incomplete Message Flag indicating that said Message keyed by said Message Number is incomplete.

18. The system of claim 17 wherein said recovery means further includes Incomplete Message Processing means for attempting to resolve the current state of a Message of which said Incomplete Message Flag is set or a Message for which said recovery means returned an I/O error with respect to a Message Segment thereof during said rebuilding of said data base means from said flat file means by said recovery means.

19. The system of claim 18 further including an Error Data Base Record (EDBR) for storing addresses of Message Segments which could not be read or written during recovery of said data base means from said flat file means and wherein said Incomplete Message Processing means comprises means for obtaining said addresses from said Error Data Base Record, means for reading from said flat file means at each said address said Message Segment thereat, means for verifying said Recovery Information in each said Message Segment contingent upon said Message Segment having been read from said flat file means without error, means for writing back each said Message Segment to said flat file means at said address corresponding thereto contingent upon said Recovery Information in said Message Segment having been successfully verified, means for utilizing said Message Number in said Recovery Information as a key to said data base for locating said data base record therein, means for obtaining said data base record contingent upon said Message Segment having been written to said flat file means without error, means for including in said data base record a pointer corresponding to said address if said Incomplete Message flag in said data base record is set, means for extracting said address from said Error Data Base Record contingent upon said inclusion of said pointer in said data base record, and means for resetting said Incomplete Message flag contingent upon said inclusion of said pointer causing said data base record to contain a complete set of said pointers.

20. The system of claim 19 further including an Unverified Flat File List (UFFL) for storing addresses of Message Segments that have not been verified, a Verified Flat File List (VFFL) for storing addresses of Message Segments that have been verified, and a Retained Segment List (RSL) storing addresses of Message Segments to be retained in said data base.

21. The system of claim 20 wherein said Recovery Means further comprises means for transferring all said addresses in said VFFL and EDBR into said UFFL, means for placing all addresses into said UFFL of Message Segments for all said data base records with said Incomplete Message Flag set, means for processing all said data base records with said Incomplete Message Flag unset by verifying said Self Pointer and said Checksum of each said Message Segment thereof without I/O error and writing each said Verified Message Segment back to said flat file means, means for processing each said Verified Message Segment successfully written back to said flat file means by determining if said Availability Marker of said Recovery Information thereof is in-use or available and by comparing said Message Number in said Recovery Information thereof with said Message Number in said data base and placing all addresses of said Message Segments successfully written back to said flat file means into said UFFL if said Availability Marker is marked available and placing all addresses of said Message Segments successfully written back to said flat file means into said UFFL if said Availability Marker is marked in-use and said Message Number in said Recovery Information thereof does not match said Message Number in said data base, means for processing each address in said UFFL by determining if said Availability Marker of said Recovery Information of each Message Segment pointed to by said address in said UFFL is marked in-use or available and placing said addresses for said Message Segments marked in-use in said RSL and placing said addresses for said Message Segments marked available in said VFFL, means for sorting said addresses in said RSL by said Message Number and said Segment Sequence Number of said Recovery Information of said Message Segments corresponding to said addresses in said RSL, and means for building said data base records utilizing said sorted addresses in said RSL for each complete message.

22. The system of claim 5 further including indicium generating means including comparison means for comparing said Message Number in said Recovery Information with said Message Number in said data base means and including determining means responsive to said Availability Marker of said Recovery Information for determining if a Message Segment is in-use or available and for generating said indicium if a Message Segment that is part of a Message in said data base means is marked in-use and said Message Number in said Recovery Information is not the same as said Message Number in said data base means and said Message Segment of said Message is pointed to by said last pointer in said data base record and said Availability Marker of said Recovery Information of the Message Segment addressed by said Last Address of said Recovery Information of said Message Segment pointed to by said last pointer in said data base record is marked in-use and said Message Number in said Recovery Information of said Message Segment pointed to by said last pointer in said data base record is the same as said Message Number in said Recovery Information of said Message Segment addressed by said Last Address of said Recovery Information of said Message Segment pointed to by said last pointer in said data base record.

23. The system of claim 4 further including indicium generating means including determining means responsive to said Availability Marker of said Recovery Information for determining if a Message Segment is in-use or available and for generating said indicium in accordance with a Message Segment being marked available that is part of a Message in said data base means.

24. The system of claim 4 wherein said indicium generating means further includes determining means responsive to said Availability Marker of said Recovery Information for determining if a Message Segment is in-use or available and for generating said indicium if a Message Segment that is part of a Message in said data base means is marked available and is not the Message Segment of said Message pointed to by said last pointer in said data base record.

25. The system of claim 4 further including indicium generating means including comparison means for comparing said Message Number in said Recovery Information with said Message Number in said data base means and including determining means responsive to said Availability Marker of said Recovery Information for determining if a Message Segment is in-use or available and for generating said indicium if a Message Segment that is part of a Message in said data base means is marked in-use and said Message Number in said Recovery Information is not the same as said Message Number in said data base means and said Message Segment of said Message is not pointed to by said last pointer in said data base record.

26. The system of claim 3 further including indicium generating means including comparison means for comparing said Message Number in said Recovery Information with said Message Number in said data base means and for generating said indicium in accordance with a mismatch therebetween.

27. The system of claim 3 further including indicium generating means including comparison means for comparing said Message Number in said Recovery Information with said Message Number in said data base means and for generating said indicium in accordance with a mismatch therebetween if said Message Segment is not a last Message Segment of said Message.

28. The system of claim 1 wherein each said Message Number is unique over the expected lifetime of said system.

29. The system of claim 28 further including Message Number generation means including Master Message Number means comprising a high-order component and a low-order component wherein each said Message Number is generated from said Master Message Number means by incrementing said low-order component whenever a new Message Number is required, incrementing said high-order component whenever said low-order component overflows or said system is initialized and storing said high-order component when said high-order component is incremented.

30. The system of claim 1 further including write-back means for writing back to said flat file means, the last Message Segment of a Message read from said flat file means after each initialization of said system.

31. The system of claim 30 wherein said write-back means includes means for writing said last Message Segment back only once after each initialization of said system.

32. The system of claim 1 wherein said Messages comprise variable-length Messages and said Message Segments comprise fixed-length Message Segments.

33. A method for use in a system for managing large volumes of volatile real-time data received as separate Messages, each said Message being comprised of Message Segments including a last Message Segment, comprising identifying each said Message by a Message Number, storing said Message Segments at respective addresses of a flat file, using a data base having an indexing structure for accessing said Messages by pointers to said addresses in said flat file, storing data base records keyed to said Message Number in said indexing structure, each keyed data base record containing pointers to said addresses in said flat file whereat Message Segments comprising said Message keyed by said Message Number reside, respectively, said pointers including a last pointer in said record corresponding to said last Message Segment, storing Recovery Information with each said Message Segment stored in said flat file for rebuilding said data base from said Recovery Information in the event an indicium indicates that said data base is inconsistent with said Recovery Information, said step of storing said Recovery Information with each Message Segment comprises including a Last Address field for storing the flat file address of the last Message Segment of the Message containing said Message Segment, and rebuilding said data base from said Recovery Information when said indicium indicates that said data base is inconsistent with said Recovery Information.

34. The method of claim 33 further including using a mirrored disk system, with said flat file comprising a duplicate flat file residing on said mirrored disk system.

35. The method of claim 33 wherein said step of storing said Recovery Information with a Message Segment comprises including a field for storing the Message Number of the message to which said Message Segment belongs.

36. The method of claim 35 wherein said step of storing Recovery Information with a Message Segment comprises including an Availability Marker field for storing an Availability Marker to indicate if said Message Segment is available for storing Message data.

37. The method of claim 36 wherein said step of storing said Recovery Information with a Message Segment comprises including a Final Flag field for containing a Final Flag when a Message Segment is the last Message Segment of a Message.

38. The method of claim 37 wherein said step of storing Recovery Information with a Message Segment comprises including a Self Pointer field for storing the flat file address at which said Message Segment resides.

39. The method of claim 38 wherein said step of storing Recovery Information with a Message Segment comprises including a field for storing a Segment Sequence Number representative of Message Segment sequence position in a Message.

40. The method of claim 39 wherein said step of storing said Recovery Information with a Message Segment comprises including a Checksum field for storing the Checksum of all other said fields comprising said Recovery Information.

41. The method of claim 40 further including storing an incremented Transaction Number in said data base, said Transaction Number being incremented in accordance with current transactions effected with respect to said data base and said flat file, recording in a TNAUDIT file selected ones of said Transaction Numbers associated with said transactions, and comparing said Transaction Numbers in said TNAUDIT file and said data base and generating said indicium when any said Transaction Number in said TNAUDIT file is larger than said Transaction Number stored in said data base.

42. The method of claim 41 further including accessing a designated Message in said flat file and sending said accessed Message over a data channel in response to a Send Message command, receiving a Message from a data channel and storing said received Message in said flat file in response to a Receive Message command, and deleting a designated Message from said flat file in response to a Delete Message command.

43. The method of claim 42 wherein said accessing and sending step comprises verifying said Recovery Information in each said Message Segment of said Message to be sent, determining from said Availability Marker of each said Message Segment of said Message to be sent if said Message Segment is in-use or available, generating said indicium if said Message Segment is marked available and is not said Message Segment of said Message pointed to by said last pointer in said data base record, comparing said Message Number in said Recovery Information in each said Message Segment of said Message to be sent with said Message Number in said data base for detecting a mismatch therebetween, generating said indicium if a Message Number mismatch is detected and said Message Segment is marked in-use and is not said Message Segment pointed to by said last pointer in said data base record, and generating said indicium if a Message Number mismatch is detected between said Message Number in said Recovery Information of said Message Segment and said Message Number in said data base and said Message Segment is marked in-use and said Message Segment is pointed to by said last pointer in said data base record and the Recovery Information of the Message Segment addressed by the Last Address of the Recovery Information of the Message Segment pointed to by said last pointer in said data base record is marked in-use and the Message Number in the Recovery Information of the Message Segment pointed to by said last pointer in said data base record is the same as the Message Number in the Recovery Information of the Message Segment addressed by the Last Address of the Recovery Information of the Message Segment pointed to by said last pointer in said data base record.

44. The method of claim 42 wherein said Receive a Message step comprises creating said Recovery Information in each Message Segment of said Message received, storing each Message Segment in said flat file except the last Message Segment of said Message, generating said Transaction Number, storing said data base, storing said Transaction Number, and storing said last Message Segment.

45. The method of claim 42 wherein said deleting step comprises verifying said Recovery Information of each said Message Segment of said Message to be deleted, determining from said Availability Marker of each said Message Segment of said Message to be deleted to determine if said Message Segment is in-use or available, generating said indicium if said Message Segment is marked available and is not said Message Segment of said Message pointed to by said last pointer in said data base record, comparing said Message Number in said Recovery Information in each said Message Segment of said Message to be deleted with said Message Number in said data base for detecting a mismatch therebetween, generating said indicium if a Message Number mismatch is detected and said Message Segment is marked in-use and is not said Message Segment pointed to by said last pointer in said data base record, and generating said indicium if a Message Number mismatch is detected between said Message Number in said Recovery Information of said Message Segment and said Message Number in said data base and said Message Segment is marked in-use and said Message Segment is pointed to by said last pointer in said data base record and the Recovery Information of the Message Segment addressed by the Last Address of the Recovery Information of the Message Segment pointed to by said last pointer in said data base record is marked in-use and the Message Number in the Recovery Information of the Message Segment pointed to by said last pointer in said data base record is the same as the Message Number in the Recovery Information of the Message Segment addressed by the Last Address of the Recovery Information of the Message Segment pointed to by said last pointer in said data base record.

46. The method of claim 42 wherein said data base record includes a field for storing a Data Base Number identifying a client application, said method further including getting, in response to a Get Message Numbers command, all of the Message Numbers in said data base records created prior to the most recent initialization of said system and having a requested Data Base Number in said Data Base Number field.

47. The method of claim 40 further including verifying said Recovery Information stored with a Message Segment by comparing said Self Pointer of said Recovery Information with said flat file address at which said Message Segment is stored and generating an error signal in accordance with a mismatch therebetween.

48. The method of claim 47 wherein said Recovery Information Verification step further includes
obtaining the Checksum of all but said Checksum field of said Recovery Information, and
comparing said Checksum generated by said Checksum obtaining step to said Checksum stored in said Checksum field of said Recovery Information and generating an error signal in accordance with a mismatch therebetween.

49. The method of claim 40 further including the step of including a field in said data base record for storing an Incomplete Message Flag indicating that said Message keyed by said Message Number is incomplete.

50. The method of claim 49 further including Incomplete Message Processing comprising attempting to resolve the current state of a Message of which said Incomplete Message Flag is set or a Message for which an I/O error was returned with respect to a Message Segment thereof during said rebuilding of said data base from said flat file.

51. The method of claim 50 wherein said system includes an Error Data Base Record including addresses of Message Segments which could not be read or written during recovery of said data base from said flat file, wherein said Incomplete Message Processing comprises
obtaining said addresses from said Error Data Base Record,
reading from said flat file at each said address said Message Segment thereat,
verifying said Recovery Information in each said Message Segment contingent upon said Message Segment having been read from said flat file without error,
writing back each said Message Segment to said flat file at said address corresponding thereto contingent upon said Recovery Information in said Message Segment having been successfully verified,
utilizing said Message Number in said Recovery Information as a key to said data base for locating said data base record therein,
obtaining said data base record contingent upon said Message Segment having been written to said flat file means without error,
including in said data base record a pointer corresponding to said address if said Incomplete Message flag in said data base record is set,
extracting said address from said Error Data Base Record contingent upon said inclusion of said pointer in said data base record, and
resetting said Incomplete Message flag contingent upon said inclusion of said pointer causing said data base record to contain a complete set of said pointers.

52. The method of claim 51 wherein said system further includes an Unverified Flat File List (UFFL) for storing addresses of Message Segments that have not been verified, a Verified Flat File List (VFFL) for storing addresses of Message Segments that have been verified and a Retained Segment List (RSL) storing addresses of Message Segments to be retained in said data base, said method further comprising
transferring all said addresses in said VFFL and EDBR into said UFFL,
placing all addresses into said UFFL of Message Segments for all said data base records with said Incomplete Message Flag set,
processing all said data base records with said Incomplete Message Flag unset by verifying said Self Pointer and said Checksum of each said Message Segment thereof without I/O error and writing each said Verified Message Segment back to said flat file means,
processing each said Verified Message Segment successfully written back to said flat file means by determining if said Availability Marker of said Recovery Information thereof is in-use or available and by comparing said Message Number in said Recovery Information thereof with said Message Number in said data base and placing all addresses of said Message Segments successfully written back to said flat file means into said UFFL if said Availability Marker is marked available and placing all addresses of said Message Segments successfully written back to said flat file means into said UFFL if said Availability Marker is marked in-use and said Message Number in said Recovery Information thereof does not match said Message Number in said data base,
processing each address in said UFFL by determining if said Availability Marker of said Recovery Information of each Message Segment pointed to by said address in said UFFL is marked in-use or available and placing said addresses for said Message Segments marked in-use in said RSL and placing said addresses for said Message Segments marked available in said VFFL,
sorting said addresses in said RSL by said Message Number and said Segment Sequence Number of said Recovery Information of said Message Segments corresponding to said addresses in said RSL, and
building said data base records utilizing said sorted addresses in said RSL for each complete message.

53. The method of claim 37 further including generating said indicium by comparing said Message Number in said Recovery Information with said Message Number in said data base and determining from said Availability Marker of said Recovery Information if a Message Segment is in-use or available and generating said indicium if a Message Segment that is part of a Message in said data base is marked in-use and said Message Number in said Recovery Information is not the same as said Message Number in said data base and said Message Segment of said Message is pointed to by said last pointer in said data base record and said Availability Marker of said Recovery Information of the Message Segment addressed by said Last Address of said Recovery Information of said Message Segment pointed to by said last pointer in said data base record is marked in-use and said Message Number in said Recovery Information of said Message Segment pointed to by said last pointer in said data base record is the same as said Message Number in said Recovery Information of said Message Segment addressed by said Last Address of said Recovery Information of said Message Segment pointed to by said last pointer in said data base record.

54. The method of claim 36 further including generating said indicium by determining from said Availability Marker of said Recovery Information if a Message Segment is in-use or available and generating said indicium in accordance with a Message Segment being marked available that is part of a Message in said data base.

55. The method of claim 36 wherein said step of generating said indicium comprises determining from said Availability Marker of said Recovery Information of said Message Segments if a Message Segment is in-use or available and generating said indicium if a Message Segment that is part of a Message in said data base is marked available and is not the Message Segment of said Message pointed to by said last pointer in said data base record.

56. The method of claim 36 further including generating said indicium by comparing said Message Number in said Recovery Information with said Message Number in said data base and determining from said Availability Marker of said Recovery Information if a Message Segment is in-use of available and for generating said indicium if a Message Segment that is part of a Message Number in said data base is marked in-use and said Message Number in said Recovery Information is not the same as said Message Number in said data base and said Message Segment of said Message is not pointed to by said last pointer in said data base record.

57. The method of claim 35 further including generating said indicium by comparing said Message Number in said Recovery Information with said Message Number in said data base and generating said indicium in accordance with a mismatch therebetween.

58. The method of claim 35 further including generating said indicium by comparing said Message Number in said Recovery Information with said Message Number in said data base and generating said indicium in accordance with a mismatch therebetween if said Message Segment is not a last Message Segment of said Message.

59. The method of claim 33 further including generating each said Message Number unique over the expected lifetime of said system.

60. The method of claim 59 further including generating each said Message Number from a Master Message Number having a high-order component and a low-order component by
incrementing said low-order component whenever a new Message Number is required,
incrementing said high-order component whenever said low-order component overflows or the system performing said method is initialized, and
storing said high-order component when said high-order component is incremented.

61. The method of claim 33 further including writing back to said flat file, the last Message Segment of a Message read from said flat file after each initialization of the system performing said method.

62. The method of claim 61 wherein said writing back step includes writing said last Message Segment back only once after each initialization of the system performing said method.

63. The method of claim 33 wherein said Messages comprise variable-length Messages and said Message Segments comprise fixed-length Message Segments.

64. A method for use in a system for managing large volumes of volatile real-time data received as separate Messages, each said Message being comprised of Message Segments including a last Message Segment, comprising
identifying each said Message by a Message Number,
generating each said Message Number unique over the expected lifetime of said system,
storing said Message Segments at respective addresses of a flat file,
using a data base having an indexing structure for accessing said Messages by pointers to said addresses in said flat file,
storing data base records keyed to said Message Number in said indexing structure, each keyed data base record containing pointers to said addresses in said flat file whereat Message Segments comprising said Message keyed by said Message Number reside, respectively,
said pointers including a last pointer in said record corresponding to said last Message Segment,
storing Recovery Information with each said Message Segment stored in said flat file for rebuilding said data base from said Recovery Information in the event an indicium indicates that said data base is inconsistent with said Recovery Information, and
rebuilding said data base from said Recovery Information when said indicium indicates that said data base is inconsistent with said Recovery Information.

65. The method of claim 64 further including generating each said Message Number from a Master Message Number having a high-order component and a low-order component by
incrementing said low-order component whenever a new Message Number is required,
incrementing said high-order component whenever said low-order component overflows or the system performing said method is initialized, and
storing said high-order component when said high-order component is incremented.

* * * * *